US012761938B2

(12) United States Patent
Agarwal et al.

(10) Patent No.: US 12,761,938 B2
(45) Date of Patent: Oct. 13, 2026

(54) INTELLIGENT SEARCH SPACE PRUNING FOR VIRTUAL MACHINE ALLOCATION

(71) Applicant: Microsoft Technology Licensing, LLC, Redmond, WA (US)

(72) Inventors: Saurabh Agarwal, Redmond, WA (US); Abhisek Pan, Bellevue, WA (US); Brendon Machado, Seattle, WA (US); David Allen Dion, Bothell, WA (US); Ishai Menache, Redmond, WA (US); Karthikeyan Subramanian, Redmond, WA (US); Luke Jonathon Marshall, Redmond, WA (US); Neha Keshari, Bothell, WA (US); Thomas Moscibroda, Bellevue, WA (US); Yiran Wei, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 463 days.

(21) Appl. No.: 18/337,344

(22) Filed: Jun. 19, 2023

(65) Prior Publication Data

US 2024/0419472 A1 Dec. 19, 2024

(51) Int. Cl.
*G06F 9/455* (2018.01)

(52) U.S. Cl.
CPC .. *G06F 9/45558* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 8,065,676 | B1 | 11/2011 | Sahai et al. |
| 2013/0111468 | A1 | 5/2013 | Davis |
| 2017/0374136 | A1 | 12/2017 | Ringdahl |

(Continued)

OTHER PUBLICATIONS

Hadary et al. ("Protean: VM Allocation Service at Scale", www.usenix.org/conference/osdi20/presentation/hadary, Proceedings of the 14th USENIX Symposium on Operating Systems Design and Implementation, Nov. 4, 2020.) (Year: 2020).*

(Continued)

*Primary Examiner* — Lewis A Bullock, Jr.
*Assistant Examiner* — Kevin X Lu
(74) *Attorney, Agent, or Firm* — Ray Quinney & Nebeker P.C.; James Bullough

(57) ABSTRACT

A search space for allocating a virtual machine is pruned. An allocation request for allocating a virtual machine to a plurality of clusters is received. A valid set of clusters is generated. The valid set of clusters includes clusters of the plurality of clusters that satisfy the allocation request. An attribute associated with the allocation request is identified. A truncation parameter is determined, by a trained search space classification model, based on the identified attribute. The valid set of clusters is filtered based on the truncation parameter. A server is selected from the filtered valid set of clusters. The virtual machine is allocated to the selected server. In an aspect of the disclosure, a search space pruner generates an analysis summary based on an analysis of received telemetry data. The search space pruner trains the search space classification model to determine truncation parameters based on the analysis summary.

20 Claims, 7 Drawing Sheets

(56) References Cited

U.S. PATENT DOCUMENTS

| | | | | |
|---|---|---|---|---|
| 2018/0262563 | A1 | 9/2018 | Mohammed et al. | |
| 2022/0327002 | A1* | 10/2022 | Yang | G06F 9/5077 |
| 2023/0362103 | A1* | 11/2023 | Pan | H04L 47/745 |
| 2024/0015080 | A1* | 1/2024 | Illikkal | H04L 41/5019 |
| 2024/0037131 | A1* | 2/2024 | Magureanu | G06F 16/355 |

OTHER PUBLICATIONS

Delimitrou et al. ("Paragon: QoS-Aware Scheduling for Heterogeneous Datacenters", ASPLOS'13, Mar. 16, 2013), in view of Illikkal et al. (US PGPUB 2024/0015080) (Year: 2013).*

Hadary, et al., "Protean: VM Allocation Service at Scale", USENIX Symposium on Operating Systems Design and Implementation, Nov. 4, 2020, pp. 845-861.

International Search Report and Written Opinion received for PCT Application No. PCT/US2024/033330, Sep. 19, 2024, 20 pages.

Hadary, et al., "Protean: VM Allocation Service at Scale", In Proceedings of 14th USENIX Symposium on Operating Systems Design and Implementation, Nov. 4, 2020, pp. 845-861.

International Preliminary Report on Patentability (Chapter I) received for PCT Application No. PCT/US2024/033330, Jan. 2, 2026, 14 pages.

* cited by examiner

INTELLIGENT SEARCH SPACE PRUNING FOR VIRTUAL MACHINE ALLOCATION

BACKGROUND

Cloud computing refers to the access and/or delivery of computing services and resources, including servers, storage, databases, networking, software, analytics, and intelligence, over the Internet ("the cloud"). For instance, a database in a cloud computing environment can include clusters of servers for hosting virtual machines. A cloud computing platform may make such a database available for users and/or applications. The cloud computing platform can allocate virtual machines to clusters of a datacenter to perform various tasks on behalf of the users and/or applications. In order to allocate a new virtual machine to the clusters, an allocation system selects a server from a cluster and allocates the virtual machine to the selected server. Cloud providers allow their users to consume cloud computing resources through various infrastructure as a service (IAAS), software as a service (SAAS), and platform as a service (PAAS) offerings. With the increase in such cloud computing resources, the number of servers in clusters and clusters in the cloud computing inventory is scaled to support users of the cloud.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments are described herein for search space pruning for virtual machine allocation. In an aspect of the present disclosure, an allocation request for allocating a virtual machine to a plurality of clusters is received. A valid set of clusters is generated. The valid set of clusters includes clusters of the plurality of clusters that satisfy the allocation request. An attribute associated with the allocation request is identified. A trained search space classification model is utilized to determine a truncation parameter based at least on the identified attribute. The valid set of clusters is filtered based on the truncation parameter. A server is selected from the filtered valid set of clusters. The virtual machine is allocated to the selected server.

In a further aspect, the trained search space classification model is a rule-based model that sets a rule for inferring a truncation parameter based on the identified attribute.

In a further aspect, the trained search space classification model is a machine learning model that infers truncation parameters in near-real time based on the identified attribute.

In another aspect, a search space pruner trains the search space classification model. The search space pruner receives telemetry data and generates an analysis summary based on an analysis of the telemetry data. The search space pruner trains the classification model to determine truncation parameters based on the analysis summary. The search space pruner provides the trained search space classification model to the allocator.

In a further aspect, the search space pruner determines an expected allocation time using the trained search space classification model. The search space pruner determines the expected allocation time has a predetermined relationship with a threshold. The search space pruner retrains the trained search space classification model.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
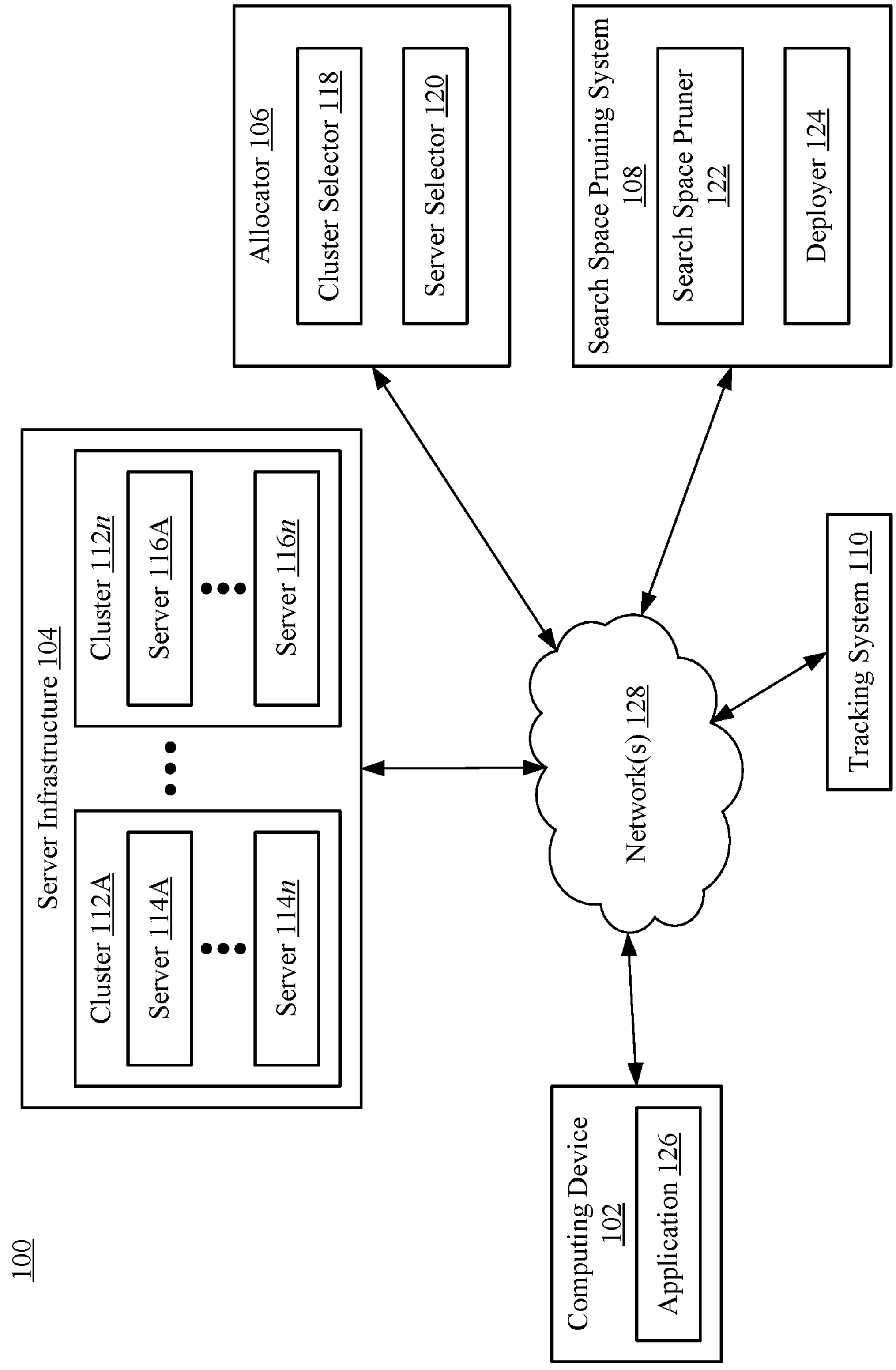
FIG. 1 shows a block diagram of a system for allocating virtual machines to a plurality of clusters in a cloud computing environment, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Embodiments for Search Space Pruning and Virtual Machine Allocation

Databases in cloud computing environments can include clusters of servers. Virtual machines are allocated to the clusters to perform tasks in workloads. In order to allocate a new virtual machine to the cluster, an allocation system (e.g., an "allocator") selects a server and allocates the virtual machine to the selected server. Depending on the implementation, the allocator may determine the (e.g., best) server for hosting the virtual machine. With the increase in use of cloud databases, the number of servers in clusters and clusters in a database is scaled accordingly, and therefore the number of servers an allocator may consider when allocating a virtual machine also increases. The clusters and servers considered by the allocator is referred to as a "search space." As the search space increases in size, the time and amount of compute resources used to allocate a virtual machine also increases.

In order to manage an increased search space, allocators may implement search space pruning techniques to selectively reduce the number of clusters and/or servers considered when allocating a virtual machine to a server. For example, an allocator in accordance with an implementation utilizes techniques for reducing the number of clusters to consider (also referred to as "early search space pruning") and techniques for selecting a server from the reduced set of clusters (also referred to as "late search space pruning"). Early search space pruning enables an allocator to reduce many candidate servers at a time by filtering out clusters (which comprise candidate servers) from consideration.

Embodiments of the present disclosure are directed to allocating virtual machines to servers in cloud computing environments. In particular, techniques described herein implement early search space pruning for virtual machine allocation. For example, an allocator in accordance with an embodiment receives a request to allocate a virtual machine to clusters in a cloud computing environment. The allocator generates a valid set of clusters that includes clusters of the cloud computing environment that satisfy the allocation request (e.g., by pruning clusters ineligible for the allocation request (e.g., clusters that do not have resources available to fulfill the request, clusters without capacity to fulfill the request, a specialized cluster that is not allowed to host a general purpose virtual machine, and/or a cluster that is otherwise ineligible to satisfy the allocation request)). The allocator identifies an attribute associated with the request. The allocator uses a trained search space classification model to determine a truncation parameter based on the identified attribute. The allocator filters the valid clusters in the cloud computing environment based on the determined truncation parameter. In this context, the allocator truncates (i.e., reduces) the number of eligible clusters considered for allocation of the virtual machine. Thus, the time taken and/or the amount of compute resources used to select a server from servers in the eligible clusters to allocate the virtual machine to is reduced.

Furthermore, as discussed further herein, the search space classification model in accordance with one or more embodiments is trained to improve scalability (e.g., by increasing the number of requests an allocator can handle, by decreasing the time taken to allocate a virtual machine, by decreasing the amount of compute resources used to allocate a virtual machine, and/or by otherwise improving an allocator in a manner that enables the allocator to allocate virtual machines for an increased number of users) and/or allocation quality (e.g., how well a virtual machine is allocated within a server (also referred to as "virtual machine packing" quality)). Therefore, by using the search space classification model to determine a truncation parameter, some embodiments of allocators described herein are able to allocate virtual machines for many users and/or applications while improving allocation quality. Moreover, improving scalability, allocation quality, or both scalability and allocation quality enables embodiments described herein to reduce allocation failures, to improve customer experience, to increase useable (e.g., sellable) capacity in a cloud computing platform, and/or to otherwise improve the utilization of clusters in a cloud computing environment to host virtual machines.

Virtual machines may be allocated to clusters in a cloud computing environment by implementing search space pruning techniques in various ways, in embodiments. For instance, FIG. 1 shows a block diagram of a system 100 for allocating virtual machines to a plurality of clusters in a cloud computing environment, in accordance with an embodiment. As shown in FIG. 1, system 100 includes a computing device 102, a server infrastructure 104, an allocator 106, a search space pruning system 108, and a tracking system 110. Each of computing device 102, server infrastructure 104, allocator 106, search space pruning system 108, and tracking system 110 are communicatively coupled via a network 128. Network 128 may comprise one or more networks such as local area networks (LANs), wide area networks (WANs), enterprise networks, the Internet, etc., and may include one or more of wired and/or wireless portions. The features of system 100 are described in detail as follows.

Server infrastructure 104 may be a network-accessible server set (e.g., a cloud-based environment or platform). As shown in FIG. 1, server infrastructure 104 includes clusters 112A and 112*n*. Each of clusters 112A and 112*n* comprises one or more servers. For example, as shown in FIG. 1, cluster 112A includes servers 114A-114*n* and cluster 112*n* includes servers 116A-116*n*. Each of servers 114A-114*n* and/or 116A-116*n* are accessible via network 128 (e.g., in a "cloud-based" embodiment (e.g., in a cloud computing environment)) to build, deploy, and manage applications and/or services. Any of servers 114A-114*n* and/or 116A-116*n* may be a storage server that comprises a plurality of physical storage disks that are accessible via network 128 and is configured to store data associated with the applications and services managed by servers 114A-114*n* and/or 116A-116*n*.

In accordance with an embodiment, one or more of clusters 112A-112*n* are co-located (e.g., housed in one or more nearby buildings with associated components such as backup power supplies, redundant data communications, environmental controls, etc.) to form a datacenter. In accordance with another embodiment, clusters of clusters 112A-112*n* are located in multiple datacenters in a distributed collection of datacenters. However, clusters 112A-112*n* may be arranged in other manners, as would be understood by a person of ordinary skill in the relevant art(s) having benefit of this disclosure. For example, clusters 112A-112*n* in accordance with an embodiment are an "inventory" of a cloud database. In this context, the inventory is arranged in a hierarchy of regions, availability zones, and datacenters. Each region comprises one or more availability zones, each availability zone comprises one or more datacenters, and each datacenter comprises one or more clusters of clusters 112A-112*n*.

Each of server(s) 114A-114*n* and 116A-116*n* may comprise one or more server computers and/or server systems. Each of server(s) 114A-114*n* and 116A-116*n* may be configured to execute one or more software applications (or "applications") and/or services and/or manage hardware resources (e.g., processors, memory, etc.), which may be utilized by users (e.g., customers) of the network-accessible server set. For example, server(s) 114A-114*n* and/or 116A-116*n* in accordance with an embodiment are configured to host virtual machines. In accordance with another embodiment, servers(s) of servers 114A-114*n* and/or 116A-116*n* are configured for specific uses. For example, any of servers 114A-114*n* and/or 116A-116*n* may be configured to execute services of allocator 106, search space pruning system 108, and/or tracking system 110 (or one or more components and/or subservices thereof). It is noted that allocator 106, search space pruning system 108, and/or tracking system 110 may be incorporated as service(s) on a computing device external to clusters 112A-112*n* and/or server infrastructure 104.

In accordance with an embodiment wherein clusters 112A-112*n* are an inventory of a cloud database, servers within an availability zone are heterogenous (e.g., servers across multiple hardware generations and stock keeping unit (SKU) configurations, including special servers for high performance computing (HPC) applications, graphics processing unit (GPU) applications, etc.). Servers in a particular availability zone may include servers from multiple generations (e.g., servers being decommissioned, servers in regular operation, servers in early-stage deployment, etc.). Continuing the example embodiment, suppose a first availability zone includes cluster 112A and 112*n*. In this example, servers in respective clusters 112A and 112*n* are homogeneous. In other words, each server of servers 114A-114*n* has the same respective SKU and configuration (i.e., a first SKU and a first configuration) and each server of servers 116A-116*n* has the same respective SKU and configuration (i.e., a second SKU and a second configuration).

As shown in FIG. 1, system 100 includes allocator 106, search space pruning system 108, and tracking system 110. As further shown in FIG. 1, each of allocator 106, search space pruning system 108, and tracking system 110 are external to server infrastructure 104 (e.g., incorporated as respective services executing on respective computing devices and/or incorporated as respective service or the same service executing on the same computing device). Alternatively, any of allocator 106, search space pruning system 108, and/or tracking system 110 (or subservices thereof) may be incorporated as a service executing on a computing device (e.g., a server or other computing device (not shown in FIG. 1)) of server infrastructure 104. In accordance with one or more alternative embodiments, any of allocator 106, search space pruning system 108 and/or tracking system 110 may be incorporated in the same system. For instance, in accordance with an allocation system embodiment, allocator 106 is incorporated with search space pruning system 108 and/or tracking system 110. As another example, in accordance with a search space management system embodiment, search space pruning system 108 and tracking system 110 are incorporated in the same system. In accordance with a further embodiment, allocator 106 and space pruning system 108 (and optionally tracking system 110) are integrated as an automated system in a software layer of an allocator engine. As shown in FIG. 1, system 100 includes an allocator 106, a search space pruning system 108, and a tracking system 110; however, it is also contemplated herein that a system may include multiple allocators, search space pruning systems, and/or tracking systems.

As shown in FIG. 1, allocator 106 includes a cluster selector 118 and a server selector 120 and search space pruning system 108 includes a search space pruner 122 and a deployer 124. Cluster selector 118 and server selector 120 are subservices of allocator 106 and search space pruner 122 and deployer 124 are subservices of search space pruning system 108. Alternatively, any of cluster selector 118, server selector 120, search space pruner 122, and/or deployer 124 are separate services.

Computing device 102 may be any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT) device, etc. In accordance with an embodiment, computing device 102 is associated with a user (e.g., an individual user, a group of users, an organization, a family user, a customer user, an employee user, an admin user (e.g., a service team user, a developer user, a management user, etc.), etc.). Computing device 102 may access server(s) of servers 114A-114*n* and/or 116A-116*n* over network 128. Computing device 102 stores data and executes computer programs, applications, and/or services.

For example, as shown in FIG. 1, computing device 102 executes an application 126. In accordance with an embodiment, application 126 enables issuing an allocation request (i.e., a virtual machine allocation request) to allocator 106. In accordance with another embodiment, application 126 enables the utilization of and/or interaction with servers 114A-114*n* and/or servers 116A-116*n*. In accordance with another embodiment, application 126 enables an admin user to access and/or interact with allocator 106, search space pruning system 108, tracking system 110 and/or respective subservices thereof.

As noted above and in accordance with an embodiment, users are enabled to issue requests to allocate virtual machines to servers of servers 114A-114*n* or 116A-116*n*. For example, a user may interact with a user interface of computing device 102 (not shown in FIG. 1) to utilize application 126 to issue an allocation request to allocator 106. In accordance with an embodiment, application 126 issues multiple allocation requests to allocator 106. For instance, as a non-limiting example, application 126 issues a service request to allocator 106, wherein the service request includes multiple virtual machine allocation requests. In this context, allocator 106 may sequentially process the multiple virtual machine allocation requests to fulfill the service request.

Cluster selector 118 receives the allocation request and selects a subset of (or all of) clusters 112A-112*n*. In embodiments, the subset of clusters are valid clusters for satisfying the allocation request. As discussed further with respect to FIGS. 2 and 3 (as well as elsewhere herein), cluster selector 118 generates the subset of clusters by filtering valid clusters using a search space classification model trained by search space pruner 122 of search space pruning system 108. Server selector 120 selects a server from servers of the subset of clusters and allocates the virtual machine to the selected server.

As noted above, in embodiments, cluster selector 118 uses a search space classification model trained by search space pruner 122 to generate a subset of clusters. Search space pruner 122 trains the search space classification model based on telemetry data generated by tracking system 110. Tracking system 110 generates the telemetry data in various ways (e.g., by tracking allocations made by allocator 106, by tracking allocation requests received from applications (e.g., application 126), by monitoring servers and/or clusters of server infrastructure 104, and/or as otherwise described elsewhere herein). In accordance with an embodiment, search space pruner 122 trains the search space classification model to co-optimize scalability and virtual machine allocation quality of allocator 106. In accordance with an embodiment, search space pruner automatically trains the model in the background (e.g., alongside regular operation of allocator 106). Additional details regarding training search space classification models are discussed with respect to FIGS. 4 and 5, as well as elsewhere herein.

Deployer 124 deploys the search space classification model trained by search space pruner 122 to allocator 106. By deploying the search space classification model in this manner, search space pruner 122 is able to (e.g., continuously) update and/or otherwise modify the search space classification model (e.g., through retraining) simultaneous to allocator 106 using the deployed version of the search space classification model to filter clusters. As discussed further with respect to FIG. 7, deployer 124 in accordance with an embodiment provides data representative of the trained search space classification model to a computing device of an admin user (e.g., computing device 102 or another computing device not shown in FIG. 1), thereby enabling the admin user to analyze the data and set rules for allocating servers. In accordance with an embodiment, deployer 124 and/or search space pruner 122 have built-in safeguards to prevent improper deployment of a search space classification model. For instance, as discussed further with respect to FIG. 6, search space pruner 122, deployer 124, and/or another component of search space pruning system 108 retrains the search space classification model if an expected allocation time is above a threshold.

III. Example Allocator Embodiments

Figure 2:
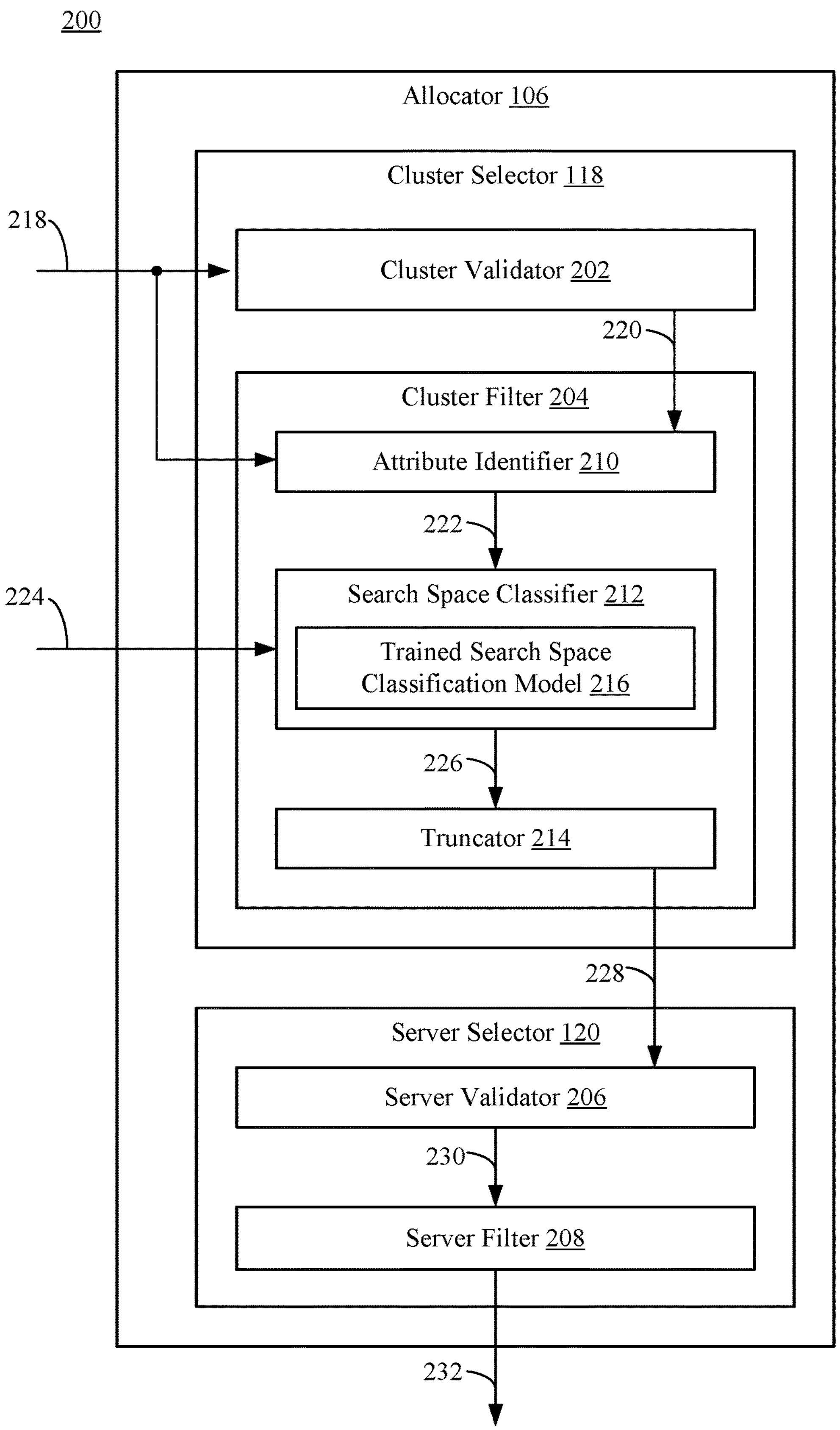
FIG. 2 shows a block diagram of the allocator of FIG. 1, in accordance with an embodiment.

Allocator 106 of system 100 may be configured to allocate a virtual machine to a server in various ways, in embodiments. For instance, FIG. 2 shows a block diagram 200 of allocator 106 of FIG. 1, in accordance with an embodiment. As shown in FIG. 2, allocator 106 comprises cluster 118 and server selector 120, as described with respect to FIG. 1 above. As further shown in FIG. 2, cluster selector 118 comprises a cluster validator 202 and a cluster filter 204 and server selector 120 comprises a server validator 206 and a server filter 208. Cluster validator 202 and cluster filter 204 are subservices of cluster selector 118 and server validator 206 and server filter 208 are subservices of server selector 120. Alternatively, any of cluster validator 202, cluster filter 204, server validator 206, and/or server filter 208 are separate services (e.g., executing on the same computing device or on separate computing devices). As also shown in FIG. 2, cluster filter 204 comprises an attribute identifier 210, a search space classifier 212, and a truncator 214, each of which are subservices of cluster filter 204. Alternatively, any of attribute identifier 210, search space classifier 212, and/or truncator 214 are a separate subservice of cluster selector 118 and/or allocator 106. Furthermore, as shown in FIG. 2, search space classifier 212 comprises a trained search space classification model 216 ("trained model 216" hereinafter). In this context, trained model 216 is a deployed version of a search space classification model trained by search space pruner 122. As shown in FIG. 2, trained model 216 is a sub-component of search space classifier 212; however, it is also contemplated herein that trained model 216 is stored in memory accessible to search space classifier 212 (e.g., memory of a computing device executing search space classifier 212 or external memory accessible to the computing device (e.g., over network 128)). Still further, in some embodiments, trained model 216 is a (e.g., machine learning (ML)) model external to search space classifier 212 that receives classification requests from, and provide results to, search space classifier 212 (e.g., over network 128). In this context, search space classifier 212 may comprise a ML classification algorithm that utilizes the trained ML model to determine a truncation parameter.

Figure 3:
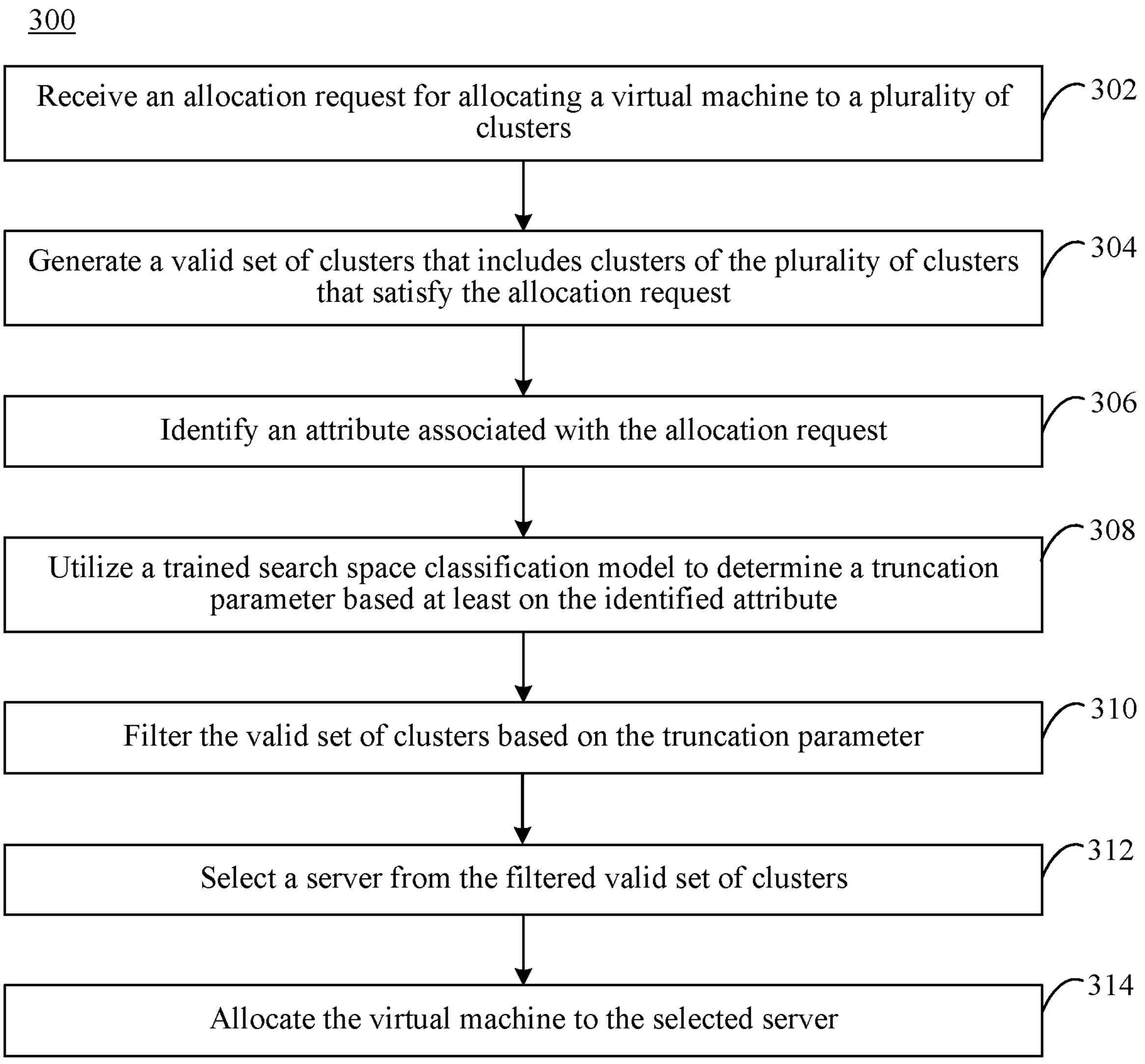
FIG. 3 shows a flowchart of a process for allocating a virtual machine to a plurality of clusters in a cloud computing environment, in accordance with an embodiment.

For illustrative purposes, allocator 106 of FIG. 2 is described below with respect to FIG. 3. FIG. 3 shows a flowchart 300 of a process for allocating a virtual machine to a plurality of clusters in a cloud computing environment, in accordance with an embodiment. Allocator 106 may operate according to flowchart 300 in embodiments. Note that not all steps of flowchart 300 need be performed in all embodiments. Further structural and operational embodiments will be apparent to persons skilled in the relevant art(s) based on the following description of FIGS. 2 and 3.

Flowchart 300 begins with step 302. In step 302, an allocation request for allocating a virtual machine to a plurality of clusters is received. For instance, cluster validator 202 receives an (e.g., virtual machine) allocation request 218 for allocating a virtual machine to clusters 112A-112*n*. In accordance with an embodiment, allocation request 218 is received as a service request to allocate virtual machines for performing a workload. In accordance with a further embodiment, the service request comprises multiple allocation requests (including allocation request 218) for allocating respective virtual machines. In this context, cluster validator 202 (and other subservices of allocator 106) may sequentially process each allocation request included in the received service request, as described elsewhere herein. In accordance with an embodiment, allocation request 218 is a simulated allocation request (e.g., a test allocation request, a troubleshooting allocation request, and/or the like).

In step 304, a valid set of clusters is generated. The valid set of clusters includes clusters of the plurality of clusters that satisfy the allocation request. For instance, cluster validator 202 of FIG. 2 determines a valid set of clusters 220, wherein valid set of clusters 220 are clusters of clusters 112A-112*n* that satisfy allocation request 218. In accordance with an embodiment, cluster validator 202 determines valid set of clusters 220 as a list of clusters of clusters 112A-112*n* that satisfy allocation request 218. In accordance with an embodiment, cluster validator 202 determines valid set of clusters 220 by pruning clusters ineligible for satisfying allocation request 218 (e.g., clusters that do not have space available to fulfill the request, specialized clusters that are unable to (or not allowed to) host the requested virtual machine, general purpose clusters that are unable to host the requested virtual machine, clusters that do not have the required hardware to satisfy the allocation request (e.g., a general purpose cluster that is unable to satisfy a request to allocate a virtual machine for a GPU application), and/or a cluster that is otherwise ineligible to satisfy the allocation request).

In step 306, an attribute associated with the allocation request is identified. For instance, attribute identifier 210 of FIG. 2 receives allocation request 218 and valid set of clusters 220 and identifies an attribute associated with allocation request 218. In accordance with an embodiment, attribute identifier 210 determines multiple attributes. Examples of attributes associated with allocation request 218 include, but are not limited to, information associated with the computing device (e.g., computing device 102 of FIG. 1) and/or application (e.g., application 126 of FIG. 1) that issued allocation request 218 (e.g., a geographic region the computing device is located in, a global position system (GPS) location of the computing device, an identifier of application 126, an identifier of computing device 102, and/or any other information associated with the computing device and/or application that issued allocation request 218 (or a corresponding service request)), a type of virtual machine requested to be allocated (e.g., the size of the virtual machine, whether or not the virtual machine may be co-located with another virtual machine, whether or not the virtual machine is a pre-provisioned (PPS) virtual machine, whether or not the virtual machine will replace a PPS virtual machine, whether or not the virtual machine is a "from-scratch" virtual machine, etc.), a number of virtual machines (and respective types) requested to be allocated, an allocation constraint (e.g., an anti-colocation constraint that specifies a requested virtual machine cannot be collocated with another virtual machine (or another virtual machine of a specific type or size), an anti-colocation constraint of an already allocated virtual machine, etc.), information associated with a user associated with allocation request 218 (e.g., a user account of the user of computing device 102, a region the user is associated with, access privileges granted to the user's user account, a subscription of the user's user account, and/or any other information associated with a user or their user account), information associated with valid set of clusters 220 (e.g., a type of a cluster in valid set of clusters 220, a type of servers (e.g., configurations of the servers, software and/or hardware capabilities of the servers, etc.) in clusters of valid set of clusters 220, an age of a cluster in valid set of clusters 220, and/or any other information associated with valid set of clusters 220), and/or any other information that would be suitable for analyzing to determine a truncation parameter, as described elsewhere herein and/or as otherwise would be understood by a person ordinarily skilled in the relevant art(s) having benefit of this disclosure. As shown in FIG. 2, attribute identifier 210 provides identified attribute(s) to search space classifier 212 via attribute signal 222. In accordance with a further embodiment, attribute signal 222 comprises the attribute(s) identified by attribute identifier 210 and valid set of clusters 220.

In step 308, a trained search space classification model is utilized to determine a truncation parameter based at least on the identified attribute. For example, search space classifier 212 of FIG. 2 utilizes trained model 216 to determine a truncation parameter based on attribute(s) identified by attribute identifier 210 (e.g., included in attribute signal 222). The truncation parameter indicates a degree to which truncator 214 is to filter (i.e., truncate) valid set of clusters 220 (as discussed further with respect to step 310). In accordance with an embodiment, search space classifier 212 determines (using trained model 216) a truncation parameter relative to a search space to be considered for allocation request 118. In this context, a "search space" is the clusters that server selector 120 considers when selecting a server to fulfill allocation request 218 (as discussed further with respect to step 312). For instance, search space classifier 212 determines a low value for the truncation parameter if search space classifier 212 (or trained model 216 on behalf of search space classifier 212) determines the search space considered by server selector 120 should be a small search space. In accordance with an embodiment, the truncation parameter is a value in a range proportional to the determined search space (e.g., with the lowest value of the truncation parameter corresponding to the smallest search space (e.g., one cluster of clusters 112A-112*n*) and with a highest value of the truncation parameter corresponding to the largest search space (e.g., all valid clusters of clusters 112A-112*n*).

In accordance with an alternative embodiment, search space classifier 212 uses trained model 216 to determine the truncation parameter from a predetermined set of values. For instance, as a non-limiting example, search space classifier 212 uses trained model 216 to determine a first truncation parameter with a low value if the determined search space falls in a first range of number of clusters (e.g., from one cluster to a first predetermined number of clusters), a second truncation parameter with a medium value if the determined search space falls in a second range (e.g., from a second predetermined number of clusters larger than the first predetermined number of clusters to a third predetermined number of clusters), and a third truncation parameter with a high value if the determined search space falls in a third range (e.g., from a fourth predetermined number of clusters larger than the third predetermined number of clusters to a maximum number of clusters (e.g., all valid clusters)).

As noted herein, trained model 216 is a trained search space classification model usable by search space classifier 212 to determine a truncation parameter for an allocation request based on attributes identified by attribute identifier 210. By utilizing a trained search space classification model to determine a truncation parameter for an allocation request, embodiments of allocators (and components thereof, e.g., search space classifiers) leverage a model trained on training data to dynamically and automatically adjust truncation parameters to improve search space pruning and virtual machine allocation (e.g., by co-optimizing scalability and allocation quality).

In accordance with an embodiment, trained model 216 is a rule-based model that sets a rule for inferring truncation parameters based on identified attributes. In this context, search space classifier 212 uses rules set by trained model 216 to infer the truncation parameter based on attribute(s) identified by attribute identifier 210 (e.g., included in attribute signal 222). Moreover, by using a rule-based model, trained model 216 may be trained "offline" (e.g., separate from the current operation of allocator 106).

In accordance with another embodiment, trained model 216 is a ML model that infers truncation parameters in near-real time based on identified attributes. In this context, search space classifier 212 provides attribute(s) included in attribute signal 222 to trained model 216 (e.g., as ML features). Trained model 216 receives the attribute(s) as input, determines the truncation parameter based on the inputted attribute(s), and provides a truncation parameter as a result to search space classifier 212.

Figure 8A:
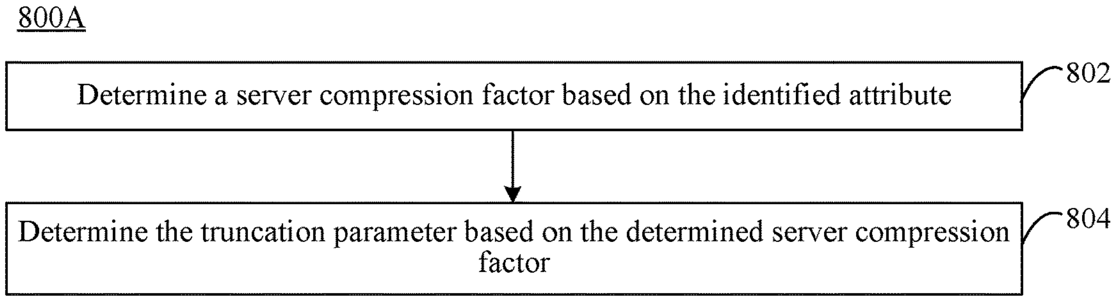
FIG. 8A shows a flowchart of a process for determining a truncation parameter, in accordance with an embodiment.
Figure 8B:
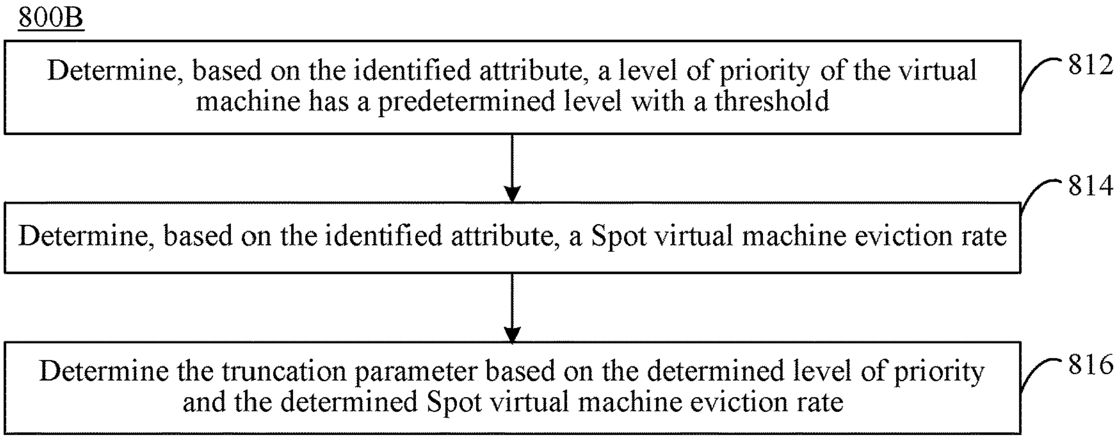
FIG. 8B shows a flowchart of a process for determining a truncation parameter, in accordance with an embodiment.
Figure 8C:
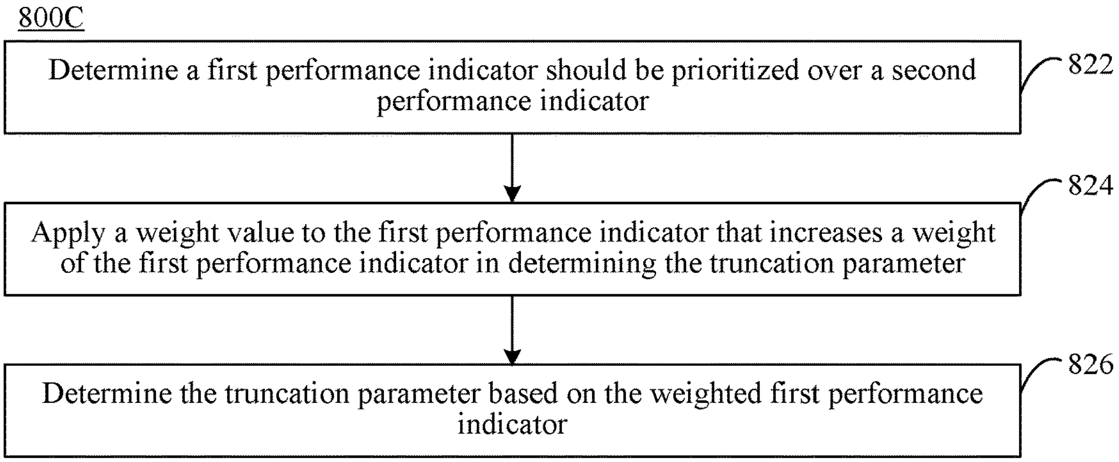
FIG. 8C shows a flowchart of a process for determining a truncation parameter, in accordance with an embodiment.

Additional details regarding determining truncation parameters using trained model 216 are discussed further with respect to FIGS. 8A-8C, as well as elsewhere herein. As shown in FIG. 2, search space classifier 212 provides the truncation parameter determined by using trained search space classification model 216 to truncator 214 via parameter signal 226. In accordance with further embodiment, parameter signal 226 comprises the result of trained model 216 (i.e., the determined truncation parameter) and valid set of clusters 220.

In step 310, the valid set of clusters is filtered based on the truncation parameter. For example, truncator 214 of FIG. 2 filters valid set of clusters 220 based on the truncation parameter determined by search space classifier 212 in step 308 (included in parameter signal 226) and provides filtered valid set of clusters 228 to server validator 206.

As described elsewhere herein, trained model 216 in accordance with an embodiment is trained to determine truncation parameters in a manner that improves scalability and/or improves allocation quality. Thus, by using the truncation parameter determined by search space classifier 212 using trained model 216, truncator 214 filters valid set of clusters in a manner that provides a reduced number of eligible clusters for satisfying allocation request 218 (i.e., filtered valid set of clusters 228) that co-optimizes scalability and allocation quality. Thus, the number of compute resources used and/or the amount of time taken to select a server (e.g., as discussed further with respect to step 312) from filtered valid set of clusters 228 is reduced (i.e., as compared to the number of compute resources that would have been used and/or the amount of time that would have been taken to select a server from all of valid set of clusters 226).

In step 312, a server is selected from the filtered valid set of clusters. For instance, server selector 120 of FIG. 2 selects a server from filtered valid set of clusters 228. Server selector 120 of FIG. 2 may select a server in various ways, depending on the implementation. For instance, as shown in FIG. 2, server selector 120 includes server validator 206 and server filter 208. The two-step process performed by server validator 206 and server filter 208 may be referred to as "late search space pruning," in some embodiments. In this context, server validator 206 determines which servers of respective servers of filtered valid set of clusters 228 are valid for fulfilling allocation request 218 and generates a valid set of servers 230. Server filter 208 filters servers from valid set of servers 230 and generates a filtered valid set of servers (not shown in FIG. 2). According to an embodiment, the filtered valid set of servers is the selected server. Alternatively, server filter 208 (or another component of server selector 120) selects a server from the filtered valid set of servers.

As noted above, server validator 206 and server filter 208 perform a late search space pruning process to generate a filtered valid set of servers from filtered valid set of clusters 228. The filtered valid set of servers may be generated in various ways, in embodiments. For instance, server validator 206 in accordance with an embodiment filters servers from valid set of clusters 228 that are ineligible for fulfilling allocation request 218 (e.g., a server whose compute resources are exhausted by virtual machines already hosted by the server). As a non-limiting example, suppose cluster 112A is included in valid set of clusters 228 and server 114A already has virtual machines installed thereon. Further suppose server 114A does not have enough storage space (or other compute resources) to host the virtual machine requested in allocation request 218. In this context, server validator 206 filters server 114A from servers in filtered valid set of clusters 228 to generate valid set of servers 230 (i.e., wherein valid set of servers 230 does not include server 114A).

As stated above, server filter 208 further filters valid set of servers 230 to generate a filtered valid set of servers. Server filter 208 may filter valid set of servers 230 in various ways, in embodiments. For instance, server filtered 208 in accordance with an embodiment is configured to filter valid set of servers 230 according to preferential server selection objectives. Examples of preferential server selection objectives include, but are not limited to, an objective to tightly allocate a virtual machine, an objective to consume a server other than a heathy empty server (HES), an objective to prioritize preserving compute capacity in a particular generation (e.g., the latest generation) of hardware, and/or any other objective that server filter 208 may use to determine which servers to include in the filtered valid set of servers and/or which servers to remove from (e.g., filter from) valid set of servers 230.

Continuing the non-limiting example described with respect to server validator 206, suppose server 114*n*, server 116A, and server 116*n* are included in valid set of servers 230. Further suppose server 116A is a HES and server 114*n* is a latest generation server. In this non-limiting example, server filter 208 filters servers from valid set of servers 230 according to a first objective to prioritize preserving compute capacity in the latest generation of servers and avoid consuming an HES. Accordingly, server filter 208 filters server 114*n* and server 116A from valid set of servers 230, and server 116*n* is included in the filtered valid set of servers (as well as any other servers that server filter 208 does not filter from valid set of servers 230).

In step 314, the virtual machine is allocated to the selected server. For instance, server filter 208 of FIG. 2 allocates the server selected in step 312 by transmitting a commitment request 232 to server infrastructure 104 of FIG. 1. In this context, commitment request 232 comprises instructions that cause server infrastructure 104 to fulfill allocation request 218 by allocating the requested virtual machine to the selected server. For instance, continuing the non-limiting example described with respect to step 312, server filter 208 selects server 116*n* from the filtered valid set of servers and transmits commitment request 232 comprising instructions that cause server infrastructure 104 to fulfill allocation request 218 by allocating the requested virtual machine to server 116*n*.

As described elsewhere herein and in accordance with some embodiments, allocation request 218 is received in a service request comprising multiple allocation requests. In this context, commitment request 232 comprises instructions that cause server infrastructure 104 to fulfill each of the allocation requests included in the service request by allocating the respective virtual machines to the respective selected servers. Alternatively, a separate commitment request is transmitted for each allocation request included in the service request.

As described herein, search space classifier 212 uses trained model 216 to determine truncation parameters based on identified attributes. In a first non-limiting example, suppose the identified attribute is an allocation constraint that specifies the requested virtual machine is a B-series virtual machine cannot be located on a server that hosts a non-B-series virtual machine. In this context, search space classifier 212 determines, by using trained model 216, a truncation parameter with a higher value than if there was not an allocation constraint. Thus, truncator 214 will filter fewer clusters from valid set of clusters 220 to generate filtered valid set of clusters 228. In this example, the likelihood of a server in filtered valid set of clusters 228 is a valid (and preferred) server for allocating the requested B-series virtual machine to is higher than if truncator 214 had aggressively filtered clusters from valid set of clusters 220.

In a second non-limiting example, suppose allocation request 218 is a request to allocate a virtual machine small in size. Further suppose attribute identifier 210 identifies a first attribute indicating the virtual machine is small in size and a second attribute indicating the virtual machine is a commonly used type of virtual machine. In this context, search space classifier 212 determines, by using trained model 216, a truncation parameter with a (e.g., relatively) low value. Thus, truncator 214 will filter more clusters from valid set of clusters 220 to generate filtered valid set of clusters 228. Thus, the time to allocate the requested virtual machine to a server is reduced (i.e., in comparison to not using a trained model to determine a truncation parameter).

In a third non-limiting example, suppose attribute identifier 210 identifies an attribute of valid set of clusters 220 that indicates the available servers are from an older server generation (e.g., a less performant server generation). In this context, search space classifier 212 determines, by using trained model 216, a truncation parameter with a higher value than if the available servers were from a newer (e.g., higher performance) server generation.

In a fourth non-limiting example, suppose attribute identifier 210 identifies an attribute of allocation request 218 that indicates the requested virtual machine is a legacy virtual machine. In this context, search space classifier 212 determines, by using trained model 216, a truncation parameter with a value such that truncator 214 does not filter clusters from valid set of clusters 220. In this context, the candidate server pool is kept at a maximum size of valid clusters of valid servers, thereby minimizing the probability of legacy virtual machines consuming a healthy empty server and spreading to multiple servers. Thus, the probability of regressing servers in the inventory to undesirable configurations is reduced.

In a fifth non-limiting example, suppose attribute identifier 210 identifies an attribute of allocation request 218 that indicates the requested virtual machine is an actual virtual machine that is to be converted from a PPS virtual machine. In this context, the number of servers that may host the virtual machine may be relatively small (e.g., servers that have space for the virtual machine and include properties in a moniker of the PPS virtual machine. In this example, search space classifier 212 determines, by using trained model 216, a truncation parameter with a relatively high value is determined. Thus, the likeliness of locating a suitable (e.g., a valid and preferred) server in filtered valid set of clusters 228 is increased.

IV. Example Search Space Pruning System Embodiments

As described herein, allocator 106 utilizes a trained search space classification model to determine truncation parameters for filtering a valid set of clusters (also referred to as "early search space pruning" herein). Depending on the implementation, a search space classification model may be trained to determine a truncation parameter in a manner that prioritizes one or more metrics, co-optimizes two or more metrics, and/or otherwise improves virtual machine allocation. In accordance with one or more embodiments, the search space classification model is trained using a search space pruning system that leverages analysis of various metrics. Examples of such metrics include, but are not limited to, performance indicators (also referred to as key performance indicators (KPIs)) (e.g., a service allocation time KPI indicating a performance objective for the time to allocate a virtual machine, an allocation quality KPI indicating how well a virtual machine fits the server it was allocated to (e.g., how optimized a server is for hosting a particular virtual machine), a spot virtual machine eviction rate KPI indicating how often spot virtual machines are evicted from an inventory, a mission critical customer KPI indicating how often virtual machines are allocated on healthier servers for mission critical customers (e.g., key customers or prioritized customers), and/or any other metric suitable for indicating the performance of allocator 106 in allocating virtual machines), metrics associated with (e.g., previously submitted or currently submitted) allocation requests (e.g., region the allocation request originated from, the computing device or application that issued the allocation request, a service request associated with the allocation request, a workload associated with the allocation request, the type of the requested virtual machine, the size of the requested virtual machine, etc.), metrics associated with an inventory (e.g., clusters 112A-112*n*) (e.g., cluster shape, fragmentation, server attributes (e.g., server health, server hardware, operating configurations, etc.), regions and/or zones of the inventory, etc.), and/or any other metrics associated with system 100 that may be utilized by search space pruning system 108 to train a search space classification model.

Figure 4:
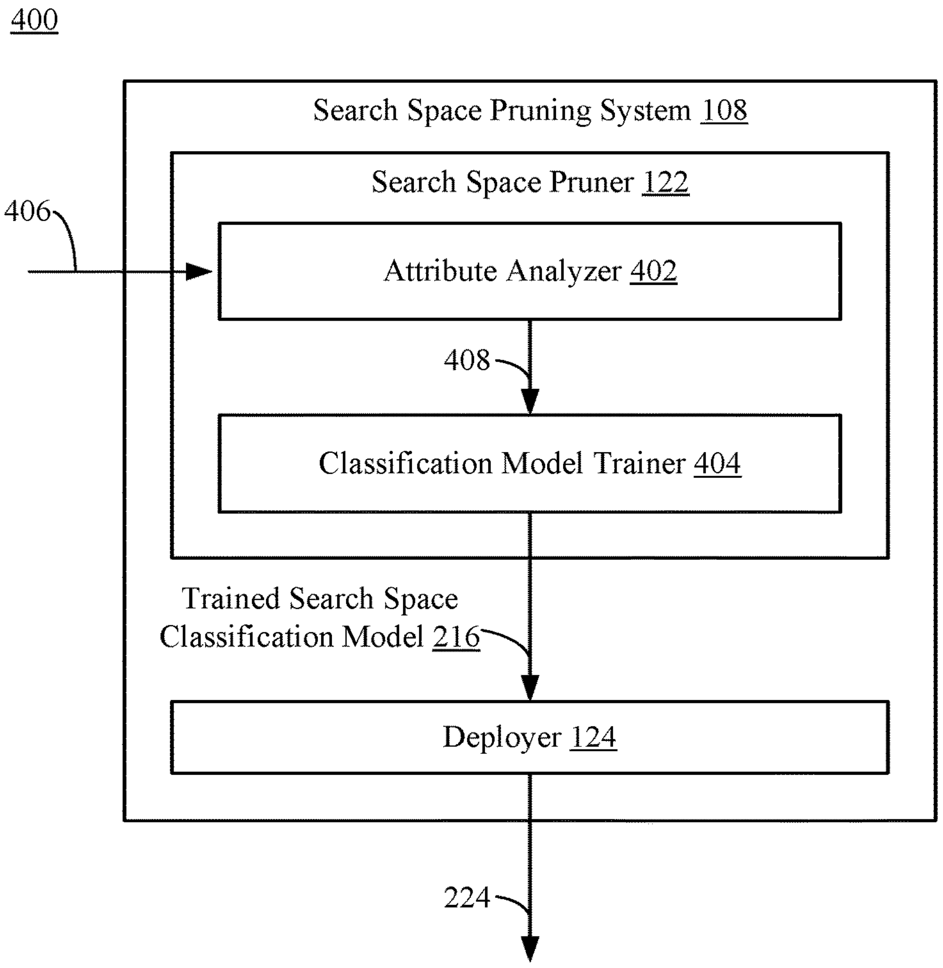
FIG. 4 shows a block diagram of the search space pruning system of FIG. 1, in accordance with an embodiment.

Search space pruning system 108 of system 100, as described with respect to FIG. 1, may be configured in various ways to train a search space classification model. For example, FIG. 4 shows a block diagram 400 of search space pruning system 108 of FIG. 1, in accordance with an embodiment. As shown in FIG. 4, search space pruning system 108 comprises search space pruner 122 and deployer 124, as described with respect to FIG. 1. As also shown in FIG. 4, search space pruner 122 comprises an attribute analyzer 402 and a classification model trainer 404, each of which are subservices of search space pruner 122. Alternatively, attribute analyzer 402 and classification model trainer 404 are separate subservices of search space pruning system 108. While deployer 124 is depicted in FIG. 4 as a service search space pruning system 108, it is also contemplated herein that deployer 124 in some embodiments is a separate service from search space pruning system 108. In accordance with an embodiment, search space pruning system 108 (or a service and/or subservice thereof) is integrated as a service or subservice of allocator 106. For example, search space pruner 122 in accordance with an embodiment is integrated in a software server of an allocator engine of allocator 106.

Figure 5:
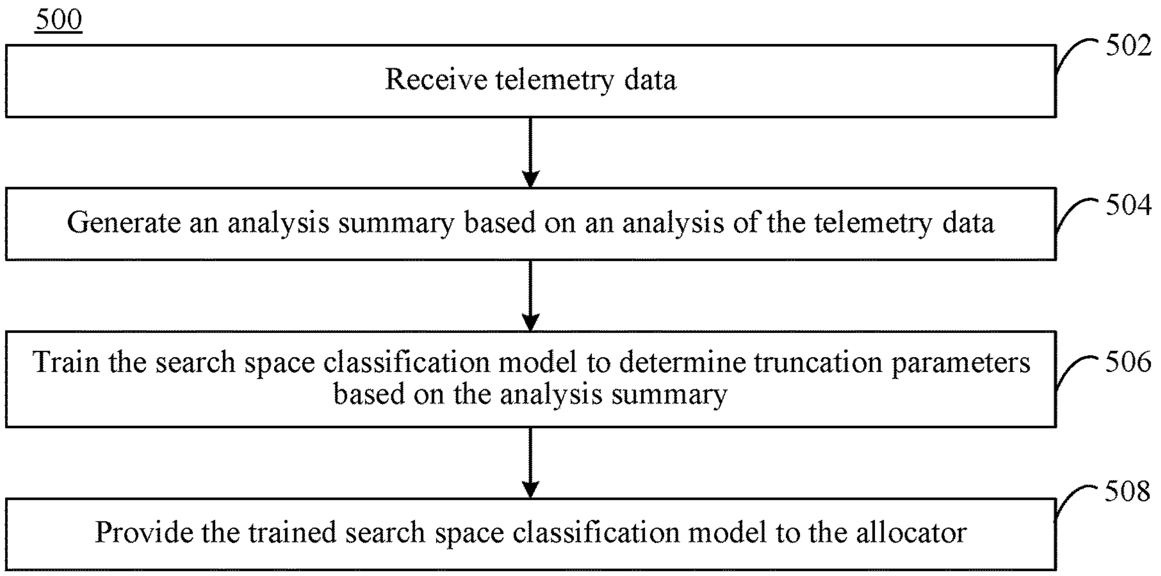
FIG. 5 shows a flowchart of a process for training a search space classification model, in accordance with an embodiment.

For illustrative purposes, search space pruning system 108 of FIG. 4 is described below with respect to FIG. 5. FIG. 5 shows a flowchart 500 of a process for training a search space classification model, in accordance with an embodiment. Search space pruning system 108 may operate according to flowchart 500 in embodiments. Note that not all steps of flowchart 500 need be performed in all embodiments. Further structural and operational embodiments will be apparent to persons skilled in the relevant art(s) based on the following description of FIGS. 4 and 5.

Flowchart 500 begins with step 502. In step 502, telemetry data is received. For example, attribute analyzer 402 of FIG. 4 receives telemetry data 406. In accordance with an embodiment, attribute analyzer 402 receives telemetry data 406 from tracking system 110. In this context, telemetry data 406 represents data of servers, computing devices, and/or operations tracked by tracking system 110. In accordance with another embodiment, attribute analyzer 402 obtains telemetry data 406 from a data store (not pictured in FIG. 4). In accordance with another embodiment, telemetry data 406 is streamed to attribute analyzer 402 (e.g., from tracking system 110, from a computing device and/or application performing an operation, from a server). In accordance with an embodiment, telemetry data 406 comprises attributes of previous allocation requests (or data corresponding to attributes of previous allocation requests).

In step 504, an analysis summary is generated based on an analysis of the telemetry data. For example, attribute analyzer 402 of FIG. 4 generates an analysis summary 408 based on an analysis of telemetry data 406. In accordance with an embodiment, attribute analyzer 402 generates analysis summary 408 to include telemetry data 406. Alternatively (or additionally), attribute analyzer 402 generates analysis summary 408 by determining information based on telemetry data 406. For instance, in accordance with an embodiment, attribute analyzer 402 determines one or more of, a server compression factor, a health empty server consumption rate, a Spot eviction rate, and/or any other data that may be derived from attributes and/or performance indicators, as described elsewhere herein.

In accordance with an embodiment, analysis summary 408 is summarized at a global level (i.e., comprising the entire inventory (e.g., clusters 112A-112*n*)), at a regional level, at an availability zone level, at a cluster level, and/or at another level of granularity for summarizing an analysis of allocation request. In this context, analysis summary 408 may comprise multiple summaries at different respective granularities. For instance, suppose the inventory of clusters 112A-112*n* is separated into two regions ("Region A" and "Region B"), and Region A is separated into three availability zones ("AZ1", "AZ2", and "AZ3"). Depending on the implementation, analysis summary 408 comprises a summary for the entire inventory, a summary for Region A, a summary for Region B, a summary for AZ1, a summary for AZ2, and/or a summary for AZ3). By analyzing telemetry data in different levels of granularity, respective patterns and characteristics for those levels of granularities can be identified and used for training trained model 216 with respect to that particular granularity.

In step 506, the search space classification model is trained to determine truncation parameters based on the analysis summary. For example, classification model trainer 404 of FIG. 4 trains a search space classification model (e.g., an untrained version of or a previous (e.g., current) version of trained model 216) to determine truncation parameters based on analysis summary 408. In this context, trained model 216 is trained to determine truncation parameters based on attributes of previous allocation requests fulfilled (or received) by allocator 106, attributes of the inventory, performance indicators, and/or any other data included in analysis summary 408. By training search space classification models in this manner, classification model trainer 404 enables the trained model (or a search space classifier using the trained model) to leverage analysis of previous allocation requests, allocations, and the server set in order to determine a truncation parameter for a particular allocation request, thereby improving the performance of an allocator in fulfilling a received allocation request. For instance, as described elsewhere herein, trained model 216 in accordance with an embodiment is trained to co-optimize scalability and allocation quality.

Classification model trainer 404 may train search space classification models to determine truncation parameters in various ways, as described elsewhere herein. For instance, as a non-limiting example, suppose analysis summary 408 comprises an analysis of health empty server consumption rate for previous allocation requests. Further suppose classification model trainer 404 is configured to train model 216 to reduce the probability of a virtual machine being allocated to a health empty server. In this context, classification model trainer 404 determines a number of available servers required to reduce the probability of consuming a health empty server to below a certain threshold (e.g., a near-zero threshold) and trains the search space classification model to determine truncation parameters that satisfy this requirement.

In another non-limiting example, suppose analysis summary 408 comprises a server compression factor (SCF) for previous allocations made by allocator 106. Further suppose analysis summary 408 includes information regarding the size of the virtual machines allocated by the previous allocations. In this example, the smaller the size of a virtual machine, the higher the corresponding SCF. Therefore, classification model trainer 404 trains the search space classification model to determine truncation parameters such that the size of the virtual machine is inversely proportional to how aggressive a valid set of clusters is truncated (e.g., determine an aggressive truncation parameter for a small virtual machine and a less aggressive truncation parameter for a large virtual machine). Further details regarding determining truncation parameters based on SCFs are described with respect to FIG. 8A, as well as elsewhere herein.

In step 508, the trained search space classification model is provided to the allocator. For example, classification model trainer 404 of FIG. 4 provides trained model 216 to allocator 106 (not shown in FIG. 4 for brevity). As shown in FIG. 4, classification model trainer 404 provides trained model 216 to deployer 124 and deployer 124 deploys trained model 216 to allocator 106 via deployment signal 224. Alternatively, classification model trainer 404 provides trained model 216 (e.g., directly) to allocator 106. In accordance with an embodiment, and as described further with respect to FIG. 7, trained model 216 (or a representation thereof) is presented in a user interface for a user (e.g., a developer user, a service team user, a customer user) to review and/or determine a rule based thereon.

Figure 6:
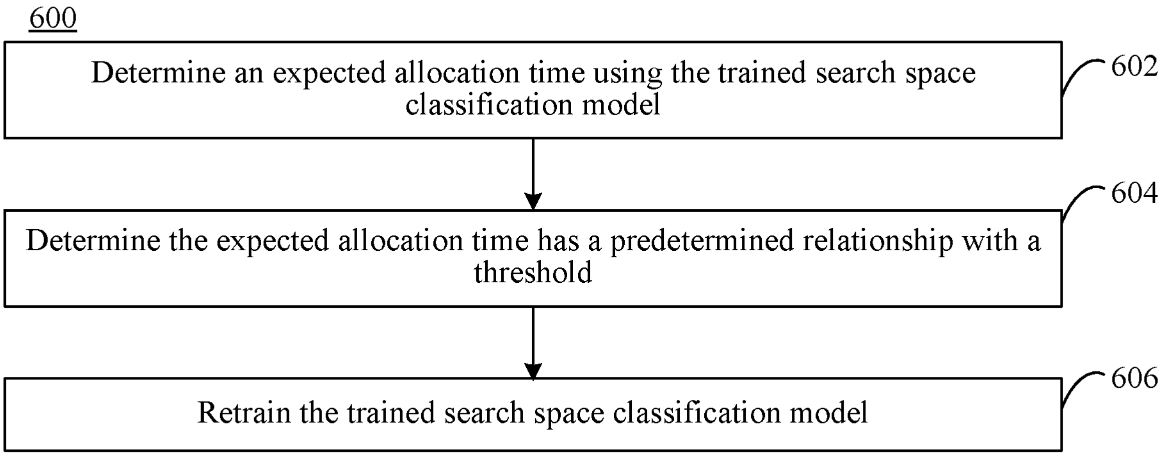
FIG. 6 shows a flowchart of a process for retraining a search space classification model, in accordance with an embodiment.

Search space pruner 122 of FIG. 4 may train search space classification models (such as trained model 216 of FIG. 2) in various ways, in embodiments. For instance, space pruner 122 may retrain a search space classification model (e.g., to update the model with the latest behavior of clusters 112A-112*n*, to update the model with attributes of additional (e.g., recently) deployed virtual machine, to decrease an expected allocation time, to increase allocation quality, and/or to improve co-optimization of the expected allocation time and allocation quality). For example, FIG. 6 shows a flowchart 600 of a process for retraining a search space classification model, in accordance with an embodiment. Search space pruner 122 may operate according to flowchart 600 in embodiments. In accordance with an embodiment, flowchart 600 is a further embodiment of step 506 of flowchart 500, as described with respect to FIG. 5. Note that not all steps of flowchart 600 need be performed in all embodiments. Further structural and operational embodiments will be apparent to persons skilled in the relevant art(s) based on the following description of FIGS. 4 and 6.

Flowchart 600 begins with step 602. In step 602, an expected allocation time is determined using trained model 216. For example, classification model trainer 404 of FIG. 4 includes a safeguard and monitoring function that tests trained model 216 (e.g., during the training of trained model 216, subsequent to the completion of trained model 216 prior to the deployment thereof, subsequent to the deployment of trained model 216, etc.). In this context, classification model trainer 404 determines an expected allocation time for a virtual machine allocation request using trained model 216. For instance, classification model trainer 404 simulates an allocation request for a virtual machine. The virtual machine requested in the simulated request may be a common virtual machine (e.g., a most used type of virtual machine), a virtual machine of a particular size (e.g., a small virtual machine, a large virtual machine (e.g., the maximum size of a virtual machine that may be hosted by a server of the inventory), an average size of a virtual machine allocated in previous allocations made by allocator 106, and/or the like), a specialized virtual machine, and/or any other type virtual machine allocator 106 may be requested to allocate to a server. In accordance with a further embodiment, classification model trainer 404 simulates multiple requests (e.g., with different parameters for a requested virtual machine). Classification model trainer 404 uses the trained model 216 to determine a truncation parameter based on attributes of the simulated request and, based on the determined truncation parameter, determines an expected time to allocate the simulated virtual machine. In accordance with an embodiment, classification model trainer 404 determines the expected time based on records (e.g., stored in a data store accessible to classification model trainer 404, not shown in FIG. 4) of previous allocations. In accordance with an embodiment, classification model trainer 404 calculates the expected time as a function of the number of clusters in a set of valid clusters after the set is filtered with the determined truncation parameter and the time it takes server selector 120 to consider servers in the filtered set of valid clusters to select a server to allocate the simulated virtual machine.

In step 604, a determination that the expected allocation time has a predetermined relationship with a threshold is made. For example, classification model trainer 404 of FIG. 4 determines the expected allocation time determined in step 602 has a predetermined relationship with a threshold. For instance, classification model trainer 404 may determine the expected allocation time meets or exceeds a maximum allocation time threshold.

In step 606, the trained search space classification model is retrained. For example, classification model trainer 404 of FIG. 4 retrains trained model 216 (e.g., in response to the determination made in step 604). For instance, if the expected allocation time meets or exceeds a maximum allocation time threshold, classification model trainer 404 determines trained model 216 is to be retrained in a manner that increases how aggressive truncation parameters determined by using trained model 216 are. In accordance with an embodiment, trained model 216 is entirely retrained. In accordance with another embodiment, trained model 216 is retrained for a subset of allocation request attributes (e.g., attributes of the simulated allocation request, attributes of allocation requests related to the simulated allocation request, etc.). In accordance with an embodiment, trained model 216 is retrained for a particular region or availability zone. For instance, suppose the expected allocation time for a particular availability zone exceeds the maximum allocation time threshold. In this context, trained model 216 is (e.g., only) retrained to determine truncation parameters for that availability zone, rather than having to retrain the entire trained model. Thus, by selectively determining portions of trained model 216, the overall performance of trained model 216 may be improved while conserving compute resources used to retrain trained model 216.

Figure 7:
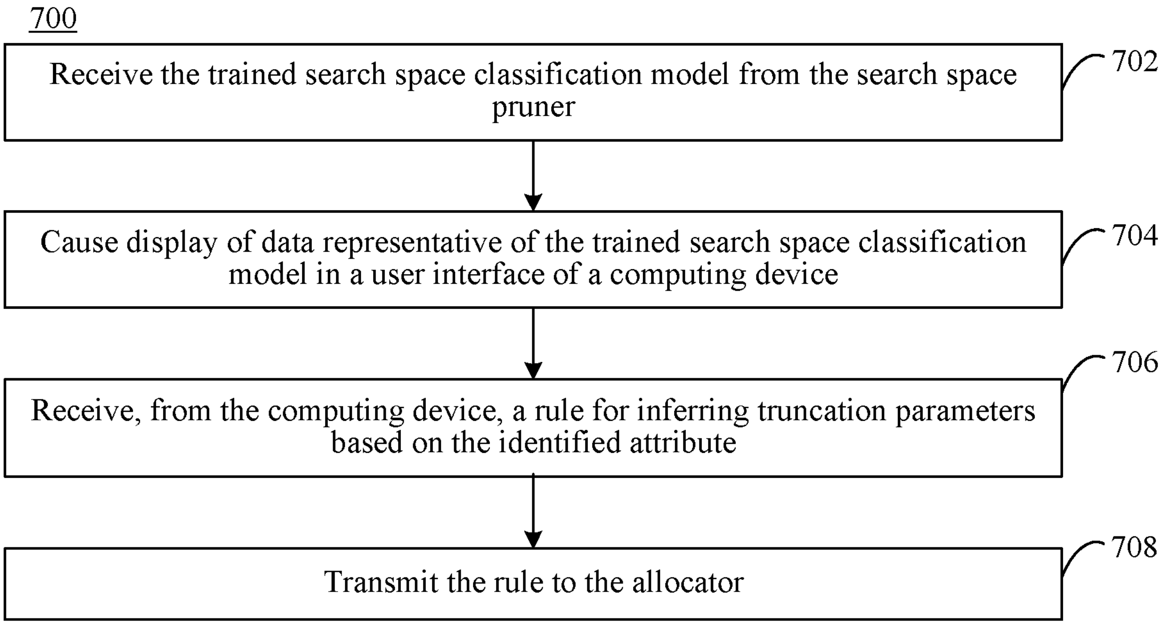
FIG. 7 shows a flowchart of a process for deploying a rule, in accordance with an embodiment.

Search space pruner 122 may provide the trained search space classification model to allocator 106 in various ways, in embodiments. For instance, as shown in FIG. 4, search space pruner 122 transmits the trained search space classification model to deployer 124 as pruner result 410 and deployer 124 transmits the trained search space classification model via deployment signal 224. As discussed elsewhere herein, deployment signal 224 may include the trained search space classification model, a representation of the trained search space classification model, or data otherwise associated with or derived from the trained search space classification model. For example, in accordance with an embodiment, deployer 124 transmits a rule (e.g., a rule for inferring truncation parameters based on identified attributes) determined based on an analysis of the trained search space classification model via deployment signal 224. Such rules may be determined and deployed in various ways, in embodiments. For instance, FIG. 7 shows a flowchart 700 of a process for deploying a rule, in accordance with an embodiment. Deployer 124 of FIG. 4 may operate according to flowchart 700 in embodiments. In accordance with an embodiment, flowchart 700 is a further embodiment of step 508 of flowchart 500, as described with respect to FIG. 5. Note that not all steps of flowchart 700 need be performed in all embodiments. Further structural and operational embodiments will be apparent to persons skilled in the relevant art(s) based on the following description of FIGS. 2 and 7.

Flowchart 700 begins with step 702. In step 702, the trained search space classification model is received from the search space pruner. For example, deployer 124 of FIG. 4 receives trained model 216 from search space pruner 122. In accordance with an embodiment, deployer 124 transmits a request for the most recent version of trained model 216 (not shown in FIG. 4) to search space pruner 122 and receives trained model 216 as a response to the request. Alternatively, trained model 216 is provided to deployer 124 by classification model trainer 404 (e.g., subsequent to an iteration of training). In accordance with an alternative embodiment, search space pruner 122 stores trained model 216 in memory accessible to search space pruner 122 and deployer 124. In this alternative, deployer 124 retrieves trained model 216 from the memory (e.g., periodically, in response to a request from an application or a user, etc.).

In step 704, display of data representative of the trained search space classification model in a user interface of a computing device is caused. For example, deployer 124 of FIG. 4 transmits trained model 216, a subset of trained model 216, or data representative of trained model 216 to computing device 102 (e.g., to application 126). For instance, deployer 124 may determine truncating criteria or rules based on trained model 216 and provide the determined truncating criteria or rules to computing device 102 of FIG. 1. In this context, computing device 102 displays the received data (e.g., a representation of the entire trained model 216, a representation of a subset of trained model 216, a representation of rules for inferring truncation parameters, a representation of machine learning features for inferring truncation parameters, etc.) in a user interface of computing device 102 (e.g., a graphic user interface of application 126).

In this context, application 126 enables a user (e.g., a customer determining truncation parameters for their subscription to an inventory, a developer of allocator 106 determining truncation parameters for all or a subset of allocator 106, and/or the like) to view the data representative of trained model 216 and approve, disapprove, set, or select rules for inferring truncation parameters. In accordance with an embodiment, application 126 presents a set of rules based on trained model 216. In accordance with another embodiment, application 126 enables the user to specify or modify rules.

In step 706, a rule for inferring truncation parameters based on the identified attribute is received from the computing device. For example, deployer 124 of FIG. 4 receives, from computing device 102, rule(s) selected, approved, and/or set by a user interacting with the user interface wherein the data representative of trained model 216 was presented. In accordance with an embodiment, the rule is used to retrain trained model 216.

In step 708, the rule is transmitted to the allocator. For example, deployer 124 of FIG. 4 transmits deployment signal 224 to search space classifier 212, wherein deployment signal 224 comprises the rule received in step 706 from computing device 102. In this context, the transmitted rule is a representation of trained model 216. Deployment signal 224 in accordance with a further embodiment includes additional rules associated with trained model 216.

V. Example Embodiments for Determining Truncation Parameters

As described herein, trained model 216 of FIG. 2 is trained such that search space classifier 212 uses trained model 216 to determine truncation parameters in a manner that improves virtual machine allocation. For instance, trained model 216 may be trained to improve scalability, improve allocation quality, co-optimize scalability and allocation quality, improve another performance indicator (e.g., a spot virtual machine eviction rate KPI indicating how often spot virtual machines are evicted from an inventory, a mission critical customer KPI indicating how often virtual machines are allocated on healthier servers for mission critical customers, co-optimize two or more performance indicators, etc.).

As noted above, search space classifier 212 of FIG. 2 in accordance with an embodiment may utilize trained model 216 to determine truncation parameters in a manner that co-optimizes scalability and allocation quality. For instance, having a large pool of candidate servers (e.g., by filtering few (if any) clusters from a valid set of clusters) may improve allocation quality (e.g., by increasing virtual machine packing quality). However, the time and resources required by server selector 120 to select a server increases with the number of candidate servers, thereby adversely impacting scalability of allocator 106. Thus, some embodiments of search space classifiers are configured to balance the tradeoff between aggressive early search space pruning (thereby reducing the time and compute resources to select a server during late search space pruning) and light early search space pruning (thereby increasing allocation quality), for instance, by co-optimizing scalability and allocation quality. Truncation parameters may be determined in a manner that co-optimizes scalability and allocation quality may be co-optimized in various ways, in embodiments. For instance, search space classifier 212 in accordance with an embodiment utilizes trained model 216 to determine a truncation parameter that co-optimizes scalability and allocation quality based on a server compression factor. For instance, FIG. 8A shows a flowchart 800A of a process for determining a truncation parameter, in accordance with an embodiment. Search space classifier 212 may operate according to flowchart 800A in embodiments. In accordance with an embodiment, flowchart 800A is a further embodiment of step 308 of flowchart 300, as described with respect to FIG. 3. Note that not all steps of flowchart 700 need be performed in all embodiments. Further structural and operational embodiments will be apparent to persons skilled in the relevant art(s) based on the following description of FIGS. 2 and 8A.

Flowchart 800A begins with step 802. In step 802, a server compression factor (SCF) is determined based on the identified attribute. For example, search space classifier 212 determines the SCF based on the attribute identified by attribute identifier 210. In accordance with an embodiment, the identified attribute is the SCF. In accordance with another embodiment, the identified attribute is a type of virtual machine, a size of a virtual machine, and/or another attribute of allocation request 218, as described elsewhere herein. In this latter context, search space classifier 212 determines the SCF based on the identified attribute (e.g., according to previous allocation requests fulfilled by allocator 106 with attributes similar to the identified attribute of allocation request 218). In accordance with an embodiment, search space classifier 212 uses trained model 216 to determine the SCF. In accordance with an embodiment, the SCF is determined as a sub-step of determining the truncation parameter.

In accordance with an embodiment, the SCF is determined according to the following equation:

$$SCF = \frac{SC_{PostValidation}}{SC_{PreValidation}} \quad \text{Equation 1}$$

wherein $SC_{PostValidation}$ is the number of servers after server validator 206 filters servers from servers of a filtered valid set of clusters 228 provided thereto and $SC_{PreValidation}$ is the number of servers in the provided filtered valid set of clusters. As described herein, trained model 216 is trained based on previously fulfilled allocation requests. In this context, the determined SCF is an expected SCF based on the data trained model 216 was trained on.

In step 804, the truncation parameter is determined based on the determined server compression factor. For example, search space classifier 212 utilizes trained model 216 to determine the truncation parameter based on the SCF determined in step 802. In embodiments, a small SCF corresponds to server validation rules that are highly discriminating, thus leaving few servers eligible for fulfilling a given allocation request. This could be due to various factors (e.g., an allocation constraint for the requested virtual machine) described elsewhere herein. A large SCF corresponds to server validation rules that are not highly discriminating, thus leaving many eligible servers for fulfilling a given allocation request. In other words, the SCF may be considered a measure of how aggressive server validation rules are for pruning candidate servers for a particular allocation request. By determining a truncation parameter based on the expected SCF for a particular allocation request, trained model 216 (or search space classifier 212 using trained model 216) determines how aggressive late search space pruning (e.g., typically) is expected to be for the allocation request. For instance, if SCF is high (i.e., many valid servers after filtering by server validator 206), the determined truncation parameter causes truncator 214 to aggressively filter clusters from valid set of clusters 220, therefore improving scalability with relatively low (or negligible) impact to allocation quality.

As noted above, search space classifier 212 of FIG. 2 may determine truncation parameters in various ways, in embodiments. For instance, search space classifier 212 in accordance with an embodiment utilizes trained model 216 to determine a truncation parameter in a manner that improves a Spot eviction rate performance indicator. Search space classifier 212 may determine a truncation parameter in a manner that improves a Spot eviction rate performance indicator in various ways, in embodiments. For instance, FIG. 8B shows a flowchart 800B of a process for determining a truncation parameter, in accordance with an embodiment. Search space classifier 212 may operate according to flowchart 800B in embodiments. In accordance with an embodiment, flowchart 800B is a further embodiment of steps 306 and/or 308 of flowchart 300, as described with respect to FIG. 3. Note that not all steps of flowchart 800B need be performed in all embodiments. Further structural and operational embodiments will be apparent to persons skilled in the relevant art(s) based on the following description of FIGS. 2 and 8B.

Flowchart 800B begins with step 812. Depending on the implementation, step 812 may be a further embodiment of step 306 or step 308 of flowchart 300. In step 812, a level of priority of the virtual machine is determined to have a predetermined level with a threshold based on the identified attribute. For example, attribute identifier 210 identifies an attribute corresponding with a level of priority of the requested virtual machine. The level of priority indicates whether or not the allocation of the requested virtual machine should be prioritized above other virtual machines (e.g., other requested virtual machines (e.g., requested in a service request), virtual machines already allocated to servers of valid set of clusters 220. Depending on the implementation, the identified attribute may be the level priority (e.g., a level of priority included in allocation request 218, a level of priority assigned to a particular type of virtual machine (e.g., by a user or customer that issued the request, by a customer that subscribes to services provided by a cloud provider associated with allocator 106, by a developer of allocator 106, and/or the like), and/or the like) or attributes that, when provided to search trained model 216 (or space classifier 212), enable trained model 216 (or space classifier 212 using trained model 216) to determine the level of priority of the requested virtual machine.

Flowchart 800B continues with step 814. Depending on the implementation, step 814 may be a further embodiment of step 306 or step 308 of flowchart 300. In step 814, a Spot virtual machine eviction rate is determined based on the identified attribute. For example, attribute identifier 210 identifies an attribute corresponding to a Spot virtual machine eviction rate (a "Spot eviction rate" herein). In accordance with an embodiment, attribute identifier 210 identifies the Spot eviction rate based on an eviction rate of Spot virtual machines hosted by servers of valid set of clusters 220 over a period of time (e.g., in the last hour, in the last day, in the last week, since a predetermined time, in a particular time window). In accordance with an embodiment, attribute identifier 210 identifies the Spot eviction rate based on an eviction rate of Spot virtual machines hosted by servers of all clusters in an inventory (e.g., clusters 112A-**112*n***).

Flowchart 800B continues with step 816. In accordance with an embodiment, step 816 is a further embodiment of step 308 of flowchart 300. In step 816, the truncation parameter is determined based on the determined level of priority and the determined Spot eviction rate. For example, search space classifier 212 of FIG. 2 utilizes trained model 216 to determine a truncation parameter based on the level of priority determined in step 812 and the Spot eviction rate determined in step 814. In this context, trained model 216 is trained to determine a truncation parameter for allocating the requested virtual machine in a manner that improves a Spot eviction rate performance indicator. As a non-limiting example, suppose a Spot eviction rate performance indicator specifies an average Spot eviction rate for a particular time period (e.g., the last hour) is to be below a threshold value. In this example, further suppose the Spot virtual machine eviction rate is above the threshold value, trained model 216 (or search space classifier 212 using trained model 216) in this context determines a value of a truncation parameter such that truncator 214 does not aggressively filter clusters from valid set of clusters 220, thereby reducing the likelihood that a Spot virtual machine is to be evicted from a server in order to allocate the requested virtual machine.

As noted above, search space classifier 212 of FIG. 2 may determine truncation parameters in various ways, in embodiments. For instance, a truncation parameter may be determined in a manner that improves a performance indicator and/or co-optimizes two or more performance indicators. In some embodiments, search space classifier 212, using trained model 216, applies weights to one or more performance indicator(s) in order to determine a truncation parameter. In this context, search space classifier 212, using trained model 216, determines a truncation parameter based on the weighted performance indicator(s). Search space classifier 212, using trained model 216, may apply weights and determine a truncation parameter based on weighted performance indicators in various ways, in embodiments. For example, FIG. 8C shows a flowchart 800C of a process for determining a truncation parameter, in accordance with an embodiment. Search space classifier 212 may operate according to flowchart 800C in embodiments. In accordance with an embodiment, flowchart 800C is a further embodiment of step 308 of flowchart 300, as described with respect to FIG. 3. Note that not all steps of flowchart 800C need be performed in all embodiments. Further structural and operational embodiments will be apparent to persons skilled in the relevant art(s) based on the following description of FIGS. 2 and 8C.

Flowchart 800C begins with step 822. In step 822, a determination that a first performance indicator should be prioritized over a second performance indicator is made. For example, search space classifier 212 of FIG. 2, using trained model 216, determines a first performance indicator should be prioritized over a second performance indicator. In accordance with an embodiment, trained model 216 is trained to prioritize the first performance indicator over the second performance indicator. Alternatively, trained model 216 is trained to prioritize the first performance indicator over the second performance indicator based on additional data (e.g., an identified attribute, an indication from tracking system 110, a configuration setting from of allocator 106). As a non-limiting running example, suppose the identified attribute identified in step 306 of flowchart 300 of FIG. 3 indicates there is a server supply crunch (i.e., the total number of servers available in valid set of clusters 220 is below a crunch threshold). In this example, trained model 216 determines allocation quality should be prioritized over scalability (or the time taken and/or compute resources used to fulfill allocation request 218). In accordance with an embodiment, a user (e.g., a developer of allocator 106, or a customer of the cloud computing platform) interacts with a user interface of a computing device (e.g., computing device 102) to implement an override of allocator 106 that prioritizes a particular performance indicator. For instance, a developer may interact with a user interface of computing device 102 to implement an override that prioritizes allocation quality for key customers of the cloud computing platform.

In step 824, a weight value is applied to the first performance indicator that increases a weight of the first performance indicator in determining the truncation parameter. For example, search space classifier 212 of FIG. 2, using trained model 216, applies a weight value to the first performance indicator that increases a weight of the first performance indicator in determining the truncation parameter. With continued reference to the non-limiting running example described with respect to step 822, trained model 216 applies a weight value to allocation quality that increases the weight of allocation quality in determining the truncation parameter.

In step 826, the truncation parameter is determined based on the weighted identified attribute. For example, search space classifier 212 of FIG. 2, using trained model 216, determines the truncation parameter based on the weighted identified attribute. With continued reference to the non-limiting example described with respect to steps 822 and 824, trained model 216 determines the truncation parameter based on the weighted allocation quality.

While flowchart 800C of FIG. 8C (and in particular step 824) has been described with respect to applying a weight value to a performance indicator to increase the weight of the performance indicator in determining a truncation parameter, embodiments described herein are not so limited. For instance, in accordance with an alternative embodiment, search space classifier 212, using trained model 216, applies a weight value to a performance indicator (e.g., the second performance indicator) that decreases the weight of the performance indicator in determining a truncation parameter. In accordance with another alternative embodiment, search space classifier 212, using trained model 216, applies a first weight value to the first performance indicator (e.g., that increases the respective weight) and a second weight value to the second performance indicator (e.g., that decreases the respective weight).

Moreover, while flowchart 800C of FIG. 8C has been described above with respect to weighting performance indicators, it is also contemplated herein that trained model 216 (or search space classifier 212 using trained model 216) may apply weights to identified attributes. In this context, the applied weights increase or decrease the weight of the respective attribute in determining a truncation parameter. Weights may be applied to identified attributes in manners similar to those described with respect to performance indicators, as well as in manners described elsewhere herein, or as would be understood by a person ordinarily skilled in the relevant art(s) having benefit of this disclosure.

VI. Example Computer System Implementation

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 9:
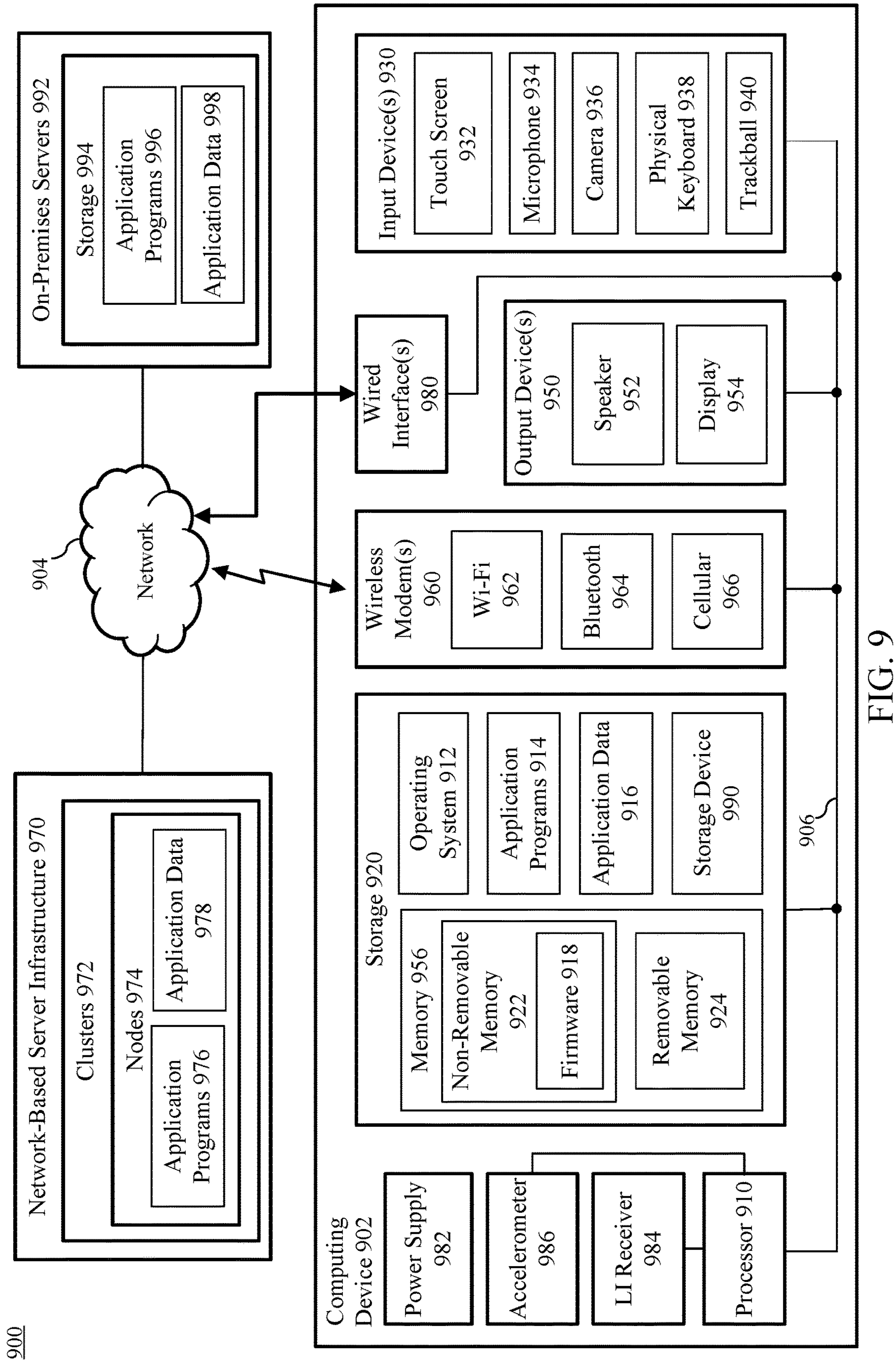
FIG. 9 shows a block diagram of an example computing system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 9. FIG. 9 shows a block diagram of an exemplary computing environment 900 that includes a computing device 902. Computing device 902 is an example of computing device 102, server 114A, server 114*n*, server 116A, and/or server 116*n* of FIG. 1, each of which may include one or more of the components of computing device 902. In some embodiments, computing device 902 is communicatively coupled with devices (not shown in FIG. 9) external to computing environment 900 via network 904. Network 904 is an example of network 128 of FIG. 1, and comprises one or more networks such as local area networks (LANs), wide area networks (WANs), enterprise networks, the Internet, etc., and may include one or more wired and/or wireless portions. Network 904 may additionally or alternatively include a cellular network for cellular communications. Computing device 902 is described in detail as follows Computing device 902 can be any of a variety of types of computing devices. For example, computing device 902 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 902 may alternatively be a stationary computing device such as a desktop computer, a personal computer (PC), a stationary server device, a minicomputer, a mainframe, a supercomputer, etc.

As shown in FIG. 9, computing device 902 includes a variety of hardware and software components, including a processor 910, a storage 920, one or more input devices 930, one or more output devices 950, one or more wireless modems 960, one or more wired interfaces 980, a power supply 982, a location information (LI) receiver 984, and an accelerometer 986. Storage 920 includes memory 956, which includes non-removable memory 922 and removable memory 924, and a storage device 990. Storage 920 also stores an operating system 912, application programs 914, and application data 916. Wireless modem(s) 960 include a Wi-Fi modem 962, a Bluetooth modem 964, and a cellular modem 966. Output device(s) 950 includes a speaker 952 and a display 954. Input device(s) 930 includes a touch screen 932, a microphone 934, a camera 936, a physical keyboard 938, and a trackball 940. Not all components of computing device 902 shown in FIG. 9 are present in all embodiments, additional components not shown may be present, and any combination of the components may be present in a particular embodiment. These components of computing device 902 are described as follows.

A single processor 910 (e.g., central processing unit (CPU), microcontroller, a microprocessor, signal processor, ASIC (application specific integrated circuit), and/or other physical hardware processor circuit) or multiple processors 910 may be present in computing device 1002 for performing such tasks as program execution, signal coding, data processing, input/output processing, power control, and/or other functions. Processor 910 may be a single-core or multi-core processor, and each processor core may be single-threaded or multithreaded (to provide multiple threads of execution concurrently). Processor 910 is configured to execute program code stored in a computer readable medium, such as program code of operating system 912 and application programs 914 stored in storage 920. Operating system 912 controls the allocation and usage of the components of computing device 902 and provides support for one or more application programs 914 (also referred to as "applications" or "apps"). Application programs 914 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 902 can communicate with any other component according to function, although not all connections are shown for ease of illustration. For instance, as shown in FIG. 9, bus 906 is a multiple signal line communication medium (e.g., conductive traces in silicon, metal traces along a motherboard, wires, etc.) that may be present to communicatively couple processor 910 to various other components of computing device 902, although in other embodiments, an alternative bus, further buses, and/or one or more individual signal lines may be present to communicatively couple components. Bus 906 represents one or more of any of several types of bus structures, including a memory bus or memory controller, a peripheral bus, an accelerated graphics port, and a processor or local bus using any of a variety of bus architectures.

Storage 920 is physical storage that includes one or both of memory 956 and storage device 990, which store operating system 912, application programs 914, and application data 916 according to any distribution. Non-removable memory 922 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 922 may include main memory and may be separate from or fabricated in a same integrated circuit as processor 910. As shown in FIG. 9, non-removable memory 922 stores firmware 918, which may be present to provide low-level control of hardware. Examples of firmware 918 include BIOS (Basic Input/Output System, such as on personal computers) and boot firmware (e.g., on smart phones). Removable memory 924 may be inserted into a receptacle of or otherwise coupled to computing device 902 and can be removed by a user from computing device 902. Removable memory 924 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 990 may be present that are internal and/or external to a housing of computing device 902 and may or may not be removable. Examples of storage device 990 include a hard disk drive, a SSD, a thumb drive (e.g., a USB (Universal Serial Bus) flash drive), or other physical storage device.

One or more programs may be stored in storage 920. Such programs include operating system 912, one or more application programs 914, and other program modules and program data. Examples of such application programs may include, for example, computer program logic (e.g., computer program code/instructions) for implementing one or more of allocator 106, search space pruning system 108, tracking system 110, cluster selector 118, server selector 120, search space pruner 122, deployer 124, application 126, cluster validator 202, cluster filter 204, server validator 206, server filter 208, attribute identifier 210, search space classifier 212, truncator 214, trained model 216, attribute analyzer 402, and/or classification model trainer 404, along with any components and/or subcomponents thereof, as well as the flowcharts/flow diagrams (e.g., flowcharts 300, 500, 600, 700, 800A, 800B, and/or 800C) described herein, including portions thereof, and/or further examples described herein.

Storage 920 also stores data used and/or generated by operating system 912 and application programs 914 as application data 916. Examples of application data 916 include web pages, text, images, tables, sound files, video data, and other data, which may also be sent to and/or received from one or more network servers or other devices via one or more wired or wireless networks. Storage 920 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 902 through one or more input devices 930 and may receive information from computing device 1002 through one or more output devices 950. Input device(s) 930 may include one or more of touch screen 932, microphone 934, camera 936, physical keyboard 938 and/or trackball 940 and output device(s) 950 may include one or more of speaker 952 and display 954. Each of input device(s) 930 and output device(s) 950 may be integral to computing device 902 (e.g., built into a housing of computing device 902) or external to computing device 902 (e.g., communicatively coupled wired or wirelessly to computing device 902 via wired interface(s) 980 and/or wireless modem(s) 960). Further input devices 930 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 954 may display information, as well as operating as touch screen 932 by receiving user commands and/or other information (e.g., by touch, finger gestures, virtual keyboard, etc.) as a user interface. Any number of each type of input device(s) 930 and output device(s) 950 may be present, including multiple microphones 934, multiple cameras 936, multiple speakers 952, and/or multiple displays 954.

One or more wireless modems 960 can be coupled to antenna(s) (not shown) of computing device 902 and can support two-way communications between processor 910 and devices external to computing device 902 through network 904, as would be understood to persons skilled in the relevant art(s). Wireless modem 960 is shown generically and can include a cellular modem 966 for communicating with one or more cellular networks, such as a GSM network for data and voice communications within a single cellular network, between cellular networks, or between the mobile device and a public switched telephone network (PSTN). Wireless modem 960 may also or alternatively include other radio-based modem types, such as a Bluetooth modem 964 (also referred to as a "Bluetooth device") and/or Wi-Fi 1062 modem (also referred to as an "wireless adaptor"). Wi-Fi modem 962 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1064 is configured to communicate with another Bluetooth-capable device according to the Bluetooth short-range wireless technology standard(s) such as IEEE 802.15.1 and/or managed by the Bluetooth Special Interest Group (SIG).

Computing device 902 can further include power supply 982, LI receiver 984, accelerometer 986, and/or one or more wired interfaces 980. Example wired interfaces 980 include a USB port, IEEE 1394 (Fire Wire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 980 of computing device 902 provide for wired connections between computing device 902 and network 904, or between computing device 902 and one or more devices/peripherals when such devices/peripherals are external to computing device 902 (e.g., a pointing device, display 954, speaker 952, camera 936, physical keyboard 938, etc.). Power supply 982 is configured to supply power to each of the components of computing device 902 and may receive power from a battery internal to computing device 902, and/or from a power cord plugged into a power port of computing device 902 (e.g., a USB port, an A/C power port). LI receiver 984 may be used for location determination of computing device 902 and may include a satellite navigation receiver such as a Global Positioning System (GPS) receiver or may include other type of location determiner configured to determine location of computing device 902 based on received information (e.g., using cell tower triangulation, etc.). Accelerometer 1086 may be present to determine an orientation of computing device 902.

Note that the illustrated components of computing device 902 are not required or all-inclusive, and fewer or greater numbers of components may be present as would be recognized by one skilled in the art. For example, computing device 902 may also include one or more of a gyroscope, barometer, proximity sensor, ambient light sensor, digital compass, etc. Processor 910 and memory 956 may be co-located in a same semiconductor device package, such as being included together in an integrated circuit chip, FPGA, or system-on-chip (SOC), optionally along with further components of computing device 902.

In embodiments, computing device 902 is configured to implement any of the above-described features of flowcharts herein. Computer program logic for performing any of the operations, steps, and/or functions described herein may be stored in storage 920 and executed by processor 910.

In some embodiments, server infrastructure 970 may be present in computing environment 900 and may be communicatively coupled with computing device 902 via network 904. Server infrastructure 970, when present, may be a network-accessible server set (e.g., a cloud computing platform). As shown in FIG. 9, server infrastructure 970 includes clusters 972. Each of clusters 972 may comprise a group of one or more compute nodes and/or a group of one or more storage nodes. For example, as shown in FIG. 9, cluster 972 includes nodes 974. Each of nodes 974 are accessible via network 904 (e.g., in a "cloud computing platform" or "cloud-based" embodiment) to build, deploy, and manage applications and services. Any of nodes 974 may be a storage node that comprises a plurality of physical storage disks, SSDs, and/or other physical storage devices that are accessible via network 904 and are configured to store data associated with the applications and services managed by nodes 1074. For example, as shown in FIG. 9, nodes 974 may store application data 978.

Each of nodes 974 may, as a compute node, comprise one or more server computers, server systems, and/or computing devices. For instance, a node 974 may include one or more of the components of computing device 902 disclosed herein. Each of nodes 974 may be configured to execute one or more software applications (or "applications") and/or services and/or manage hardware resources (e.g., processors, memory, etc.), which may be utilized by users (e.g., customers) of the network-accessible server set. For example, as shown in FIG. 9, nodes 974 may operate application programs 976. In an implementation, a node of nodes 974 may operate or comprise one or more virtual machines, with each virtual machine emulating a system architecture (e.g., an operating system), in an isolated manner, upon which applications such as application programs 976 may be executed.

In an embodiment, one or more of clusters 972 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 972 may be a datacenter in a distributed collection of datacenters. In embodiments, exemplary computing environment 900 comprises part of a cloud-based platform such as Amazon Web Services® of Amazon Web Services, Inc. or Google Cloud Platform™ of Google LLC, although these are only examples and are not intended to be limiting.

In an embodiment, computing device 902 may access application programs 976 for execution in any manner, such as by a client application and/or a browser at computing device 902. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 902 may additionally and/or alternatively synchronize copies of application programs 914 and/or application data 916 to be stored at network-based server infrastructure 970 as application programs 976 and/or application data 978. For instance, operating system 912 and/or application programs 914 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 920 at network-based server infrastructure 970.

In some embodiments, on-premises servers 992 may be present in computing environment 900 and may be communicatively coupled with computing device 902 via network 904. On-premises servers 992, when present, are hosted within an organization's infrastructure and, in many cases, physically onsite of a facility of that organization. On-premises servers 992 are controlled, administered, and maintained by IT (Information Technology) personnel of the organization or an IT partner to the organization. Application data 998 may be shared by on-premises servers 992 between computing devices of the organization, including computing device 902 (when part of an organization) through a local network of the organization, and/or through further networks accessible to the organization (including the Internet). Furthermore, on-premises servers 992 may serve applications such as application programs 996 to the computing devices of the organization, including computing device 902. Accordingly, on-premises servers 992 may include storage 994 (which includes one or more physical storage devices such as storage disks and/or SSDs) for storage of application programs 1096 and application data 998 and may include one or more processors for execution of application programs 996. Still further, computing device 902 may be configured to synchronize copies of application programs 914 and/or application data 916 for backup storage at on-premises servers 992 as application programs 996 and/or application data 998.

Embodiments described herein may be implemented in one or more of computing device 902, network-based server infrastructure 970, and on-premises servers 992. For example, in some embodiments, computing device 902 may be used to implement systems, clients, or devices, or components/subcomponents thereof, disclosed elsewhere herein. In other embodiments, a combination of computing device 902, network-based server infrastructure 970, and/or on-premises servers 992 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 920. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 914) may be stored in storage 920. Such computer programs may also be received via wired interface(s) 980 and/or wireless modem(s) 960 over network 904. Such computer programs, when executed or loaded by an application, enable computing device 902 to implement features of embodiments discussed herein. Accordingly, such computer programs represent controllers of the computing device 902.

Embodiments are also directed to computer program products comprising computer code or instructions stored on any computer-readable medium or computer-readable storage medium. Such computer program products include the physical storage of storage 920 as well as further physical storage types.

VII. Additional Exemplary Embodiments

A system in a cloud computing environment is described herein. The system comprises a plurality of clusters and an allocator. Each cluster of the plurality of clusters comprises respective servers. The allocator configured to: receive an allocation request for allocating a virtual machine to the plurality of clusters; generate a valid set of clusters that includes clusters of the plurality of clusters that satisfy the allocation request; identifies an attribute associated with the allocation request; utilize a trained search space classification model to determine a truncation parameter based at least on the identified attribute; filter the valid set of clusters based on the truncation parameter; select a server from the filtered valid set of clusters; and allocate the virtual machine to the selected server.

In one implementation of the foregoing system, the identified attribute comprises at least one of: a region a computing device is located in, the computing device having transmitted the allocation request to the allocator; a type of the virtual machine to be allocated; a number of virtual machines to be allocated; a user account associated with the allocation request; a type of a cluster in the valid set of clusters; or an age of the cluster in the valid set of clusters.

In one implementation of the foregoing system, the system further comprises a search space pruner configured to: receive telemetry data; generate an analysis summary based on an analysis of the telemetry data; train the search space classification model to determine truncation parameters based on the analysis summary; and provides the trained search space classification model to the allocator.

In one implementation of the foregoing system, the telemetry data comprises at least one of: a previous allocation request received by the allocator; region information associated with the previous allocation request; a previous allocation made by the allocator; an attribute of a cluster in the plurality of clusters; or an attribute of a respective server of the plurality of clusters.

In one implementation of the foregoing system, the search space pruner is configured to: determine an expected allocation time using the trained search space classification model; determine the expected allocation time has a predetermined relationship with a threshold; and retrain the trained search space classification model.

In one implementation of the foregoing system, the system further comprises a deployer configured to: receive the trained search space classification model from the search space pruner; cause display of data representative of the trained search space classification model in a user interface of a computing device; receive, from the computing device, a rule for inferring truncation parameters based on the identified attribute; and transmit the rule to the allocator.

In one implementation of the foregoing system, the trained search space classification model is a rule-based model that sets a rule for inferring the truncation parameter based on the identified attribute.

In one implementation of the foregoing system, the trained search space classification model is a machine learning model that infers the truncation parameter in near-real time based on the identified attribute.

In one implementation of the foregoing system, the allocator is configured to utilize the trained search space classification model to determine a truncation parameter by: determining a server compression factor based on the identified attribute; and determining the truncation parameter based on the determined server compression factor.

In one implementation of the foregoing system, the allocator is configured to utilize the trained search space classification model to determine a truncation parameter by: determining, based on the identified attribute, a level of priority of the virtual machine has a predetermined level with a threshold; determining, based on the identified attribute, a Spot virtual machine eviction rate; and determining the truncation parameter based on the determined level of priority and the determined Spot virtual machine eviction rate.

In one implementation of the foregoing system, the allocator is configured to utilize the trained search space classification model to determine a truncation parameter by: determining a first performance indicator should be prioritized over a second performance indicator; applying a weight value to the first performance indicator that increases a weight of the first performance indicator in determining the truncation parameter; and determine the truncation parameter based on the weighted first performance indicator.

A method for allocating a virtual machine to a plurality of clusters in a cloud computing environment is described herein. The method comprises: receiving an allocation request for allocating the virtual machine to the plurality of clusters; generating a valid set of clusters that includes clusters of the plurality of clusters that satisfy the allocation request; identifying an attribute associated with the allocation request; utilizing a trained search space classification model to determine a truncation parameter based at least on the identified attribute; filtering the valid set of clusters based on the truncation parameter; selecting a server from the filtered valid set of clusters; and allocating the virtual machine to the selected server.

In one implementation of the foregoing method, the identified attribute comprises at least one of: a region a computing device is located in, the computing device having transmitted the allocation request; a type of the virtual machine to be allocated; a number of virtual machines to be allocated; a user account associated with the allocation request; a type of a cluster in the valid set of clusters; or an age of the cluster in the valid set of clusters.

In one implementation of the foregoing method, the method further comprises: receiving telemetry data; generating an analysis summary based on an analysis of the telemetry data; and training the search space classification model to determine truncation parameters based on the analysis summary.

In one implementation of the foregoing method, the method further comprises providing the trained search space classification model to the allocator.

In one implementation of the foregoing method, the telemetry data comprises at least one of: a previous allocation request received by the allocator, region information associated with the previous allocation request, a previous allocation made by the allocator, an attribute of a cluster in the plurality of clusters, or an attribute of a respective server of the plurality of clusters.

In one implementation of the foregoing method, the method further comprises: determining an expected allocation time using the trained search space classification model; determining the expected allocation time has a predetermined relationship with a threshold; and retraining the trained search space classification model.

In one implementation of the foregoing method, the method further comprises: receiving the trained search space classification model from the search space pruner; causing display of data representative of the trained search space classification model in a user interface of a computing device; receiving, from the computing device, a rule for inferring truncation parameters based on the identified attribute; and transmitting the rule to an allocator.

In one implementation of the foregoing method, the trained search space classification model is a rule-based model and said utilizing a trained search space classification model to determine the truncation parameter comprises: inferring the truncation parameter based on the identified attribute and a rule of the rule-based model.

In one implementation of the foregoing method, the trained search space classification model is a machine learning model and said utilizing a trained search space classification model to determine the truncation parameter comprises: providing the identified attribute to the trained search space classification model, and receiving, from the trained search space classification model in response to said providing the identified attribute, the truncation parameter.

In one implementation of the foregoing method, said utilizing a trained search space classification model to determine the truncation parameter comprises: determining a server compression factor based on the identified attribute; and determining the truncation parameter based on the determined server compression factor.

In one implementation of the foregoing method, said utilizing a trained search space classification model to determine the truncation comprises: determining, based on the identified attribute, a level of priority of the virtual machine has a predetermined level with a threshold; determining, based on the identified attribute, a Spot virtual machine eviction rate; and determining the truncation parameter based on the determined level of priority and the determined Spot virtual machine eviction rate.

In one implementation of the foregoing method, said utilizing a trained search space classification model to determine the truncation parameter comprises: determining a first performance indicator should be prioritized over a second performance indicator; applying a weight value to the first performance indicator that increases a weight of the first performance indicator in determining the truncation parameter; and determine the truncation parameter based on the weighted first performance indicator.

An allocator is described herein. The allocator is coupled to a plurality of clusters in a cloud computing environment. The allocator comprises a processor circuit and a memory that stores program code. The program code is executable by the processor circuit to perform operations for allocating a virtual machine to the plurality of clusters. The operations comprising: receiving an allocation request for allocating a virtual machine to the plurality of clusters; generating a valid set of clusters that includes clusters of the plurality of clusters that satisfy the allocation request; identifying an attribute associated with the allocation request; utilizing a trained search space classification model to determine a truncation parameter based at least on the identified attribute; filtering the valid set of clusters based on the truncation parameter; selecting a server from the filtered valid set of clusters; and allocating the virtual machine to the selected server.

In one implementation of the foregoing allocator, the identified attribute comprises at least one of: a region a computing device is located in, the computing device having transmitted the allocation request to the allocator; a type of the virtual machine to be allocated; a number of virtual machines to be allocated; a user account associated with the allocation request; a type of a cluster in the valid set of clusters; or an age of the cluster in the valid set of clusters.

In one implementation of the foregoing allocator, the operations further comprise: receiving telemetry data; generating an analysis summary based on an analysis of the telemetry data; and training the search space classification model to determine truncation parameters based on the analysis summary.

In one implementation of the foregoing allocator, the allocator comprises a search space pruner that trains the search space classification model.

In one implementation of the foregoing allocator, the search space pruner is implemented in a software layer of the allocator.

In one implementation of the foregoing allocator, the telemetry data comprises at least one of: a previous allocation request received by the allocator, region information associated with the previous allocation request, a previous allocation made by the allocator, an attribute of a cluster in the plurality of clusters, or an attribute of a respective server of the plurality of clusters.

In one implementation of the foregoing allocator, the operations further comprises: determining an expected allocation time using the trained search space classification model; determining the expected allocation time has a predetermined relationship with a threshold; and retraining the trained search space classification model.

In one implementation of the foregoing allocator, the operations further comprise: causing display of data representative of the trained search space classification model in a user interface of a computing device; and receiving, from the computing device, a rule for inferring truncation parameters based on the identified attribute.

In one implementation of the foregoing allocator, the trained search space classification model is a rule-based model and said utilizing a trained search space classification model to determine a truncation parameter comprises: inferring the truncation parameter based on the identified attribute and a rule of the rule-based model.

In one implementation of the foregoing allocator, the trained search space classification model is a machine learning model and said utilizing a trained search space classification model to determine a truncation parameter comprises: providing the identified attribute to the trained search space classification model, and receiving, from the trained search space classification model in response to said providing the identified attribute, the truncation parameter.

In one implementation of the foregoing allocator, said utilizing a trained search space classification model to determine a truncation parameter comprises: determining a server compression factor based on the identified attribute; and determining the truncation parameter based on the determined server compression factor.

In one implementation of the foregoing allocator, said utilizing a trained search space classification model to determine a truncation parameter comprises: determining, based on the identified attribute, a level of priority of the virtual machine has a predetermined level with a threshold; determining, based on the identified attribute, a Spot virtual machine eviction rate; and determining the truncation parameter based on the determined level of priority and the determined Spot virtual machine eviction rate.

In one implementation of the foregoing allocator, said utilizing a trained search space classification model to determine a truncation parameter comprises: determining a first performance indicator should be prioritized over a second performance indicator; applying a weight value to the first performance indicator that increases a weight of the first performance indicator in determining the truncation parameter; and determine the truncation parameter based on the weighted first performance indicator.

VIII. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Further still, in some example embodiments, example truncation parameters have been described with a high value corresponding to a large search space and a low value corresponding to a small search space. However, it is also contemplated herein that some embodiments may use truncation parameters with the reverse (i.e., a high value truncation parameter corresponds to a small search space and a low value truncation parameter corresponds to a high search space).

Further still, several example embodiments have been described with respect to cloud database applications. However, it is also contemplated herein that embodiments of search space pruning for virtual machine allocation may be used in other applications (e.g., IAAS applications, PAAS applications, SAAS applications, and/or the like).

Moreover, according to the described embodiments and techniques, any components of systems, computing devices, servers, allocators, search space pruning systems, search space classification models, tracking systems, and/or deployers and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A system in a cloud computing environment, comprising:

a plurality of clusters, each cluster of the plurality of clusters comprising respective servers;

an allocator configured to:

receive an allocation request for allocating a virtual machine to the plurality of clusters;

generate a valid set of clusters that includes clusters of the plurality of clusters that satisfy the allocation request;

identify an attribute associated with the allocation request;

utilize a trained search space classification model to determine a truncation parameter by:

determining a server compression factor as a ratio of:

a first estimated number of servers to be determined valid by a server selector, and a second estimated number of servers provided to the server selector for validation, and determining a truncation parameter based at least on the server compression factor;

generate, based on the truncation parameter, a filtered valid set of clusters from the valid set of clusters that satisfies the allocation request; and provide the filtered valid set of clusters to the server selector, causing the server selector to:

validate servers within the filtered valid set of clusters based on the allocation request, select a server from the valid set of servers, and allocate the virtual machine to the selected server.

2. The system of claim 1, further comprising a search space pruner configured to:

receive telemetry data;

generate an analysis summary based on an analysis of the telemetry data;

train the search space classification model to determine truncation parameters based on the analysis summary; and provide the trained search space classification model to the allocator.

3. The system of claim 2, wherein the search space pruner is configured to:

determine an expected allocation time using the trained search space classification model;

determine the expected allocation time has a predetermined relationship with a threshold; and retrain the trained search space classification model.

4. The system of claim 2, further comprising a deployer configured to:

receives the trained search space classification model from the search space pruner;

causes display of data representative of the trained search space classification model in a user interface of a computing device;

receives, from the computing device, a rule for inferring truncation parameters based on the identified attribute; and transmits the rule to the allocator.

5. The system of claim 2, wherein the telemetry data comprises at least one of:

a previous allocation request received by the allocator;

region information associated with the previous allocation request;

a previous allocation made by the allocator;

an attribute of a cluster in the plurality of clusters; or an attribute of a respective server of the plurality of clusters.

6. The system of claim 1, wherein the trained search space classification model is a rule-based model that sets a rule for inferring the truncation parameter based on the identified attribute.

7. The system of claim 1, wherein the trained search space classification model is a machine learning model that infers the truncation parameter in near-real time based on the identified attribute.

8. The system of claim 1, wherein the allocator is configured to utilize the trained search space classification model to determine the truncation parameter by:

determining, based on the identified attribute, a level of priority of the virtual machine has a predetermined level with a threshold;

determining, based on the identified attribute, a Spot virtual machine eviction rate; and determining the truncation parameter based on the server compression factor, the determined level of priority, and the determined Spot virtual machine eviction rate.

9. The system of claim 1, wherein the allocator is configured to utilize the trained search space classification model to determine the truncation parameter by:

determining a first performance indicator should be prioritized over a second performance indicator;

applying a weight value to the first performance indicator that increases a weight of the first performance indicator in determining the truncation parameter; and determine the truncation parameter based on the server compression factor and the weighted first performance indicator.

10. The system of claim 1, wherein the identified attribute comprises at least one of:

a region a computing device is located in, the computing device having transmitted the allocation request to the allocator;

a type of the virtual machine to be allocated;
a number of virtual machines to be allocated;
a user account associated with the allocation request;
a type of a cluster in the valid set of clusters; or
an age of the cluster in the valid set of clusters.

11. A method for allocating a virtual machine to a plurality of clusters in a cloud computing environment, the method comprising:

receiving an allocation request for allocating the virtual machine to the plurality of clusters;
generating a valid set of clusters that includes clusters of the plurality of clusters that satisfy the allocation request;
identifying an attribute associated with the allocation request;
utilizing a trained search space classification model to determine a truncation parameter by:
determining a server compression factor as a ratio of:
a first estimated number of servers to be determined valid by a server selector, and
a second estimated number of servers provided to the server selector for validation, and
determining a truncation parameter based at least on the server compression factor;
generating, based on the truncation parameter, a filtered valid set of clusters from the valid set of clusters that satisfies the allocation request; and
providing the filtered valid set of clusters to the server selector, causing the server selector to:
validate servers within the filtered valid set of clusters based on the allocation request, resulting in a valid set of servers,
select a server from the valid set of servers, and
allocate the virtual machine to the selected server.

12. The method of claim 11, further comprising:
receiving telemetry data;
generating an analysis summary based on an analysis of the telemetry data; and
training the search space classification model to determine truncation parameters based on the analysis summary.

13. The method of claim 12, further comprising:
determining an expected allocation time using the trained search space classification model;
determining the expected allocation time has a predetermined relationship with a threshold; and
retraining the trained search space classification model.

14. The method of claim 11, wherein:
the trained search space classification model is a rule-based model; and
said utilizing a trained search space classification model to determine the truncation parameter comprises:
inferring the truncation parameter based on the identified attribute and a rule of the rule-based model.

15. The method of claim 12, wherein:
the trained search space classification model is a machine learning model; and
said utilizing a trained search space classification model to determine the truncation parameter comprises:
providing the identified attribute to the trained search space classification model, and
receiving, from the trained search space classification model in response to said providing the identified attribute, the truncation parameter.

16. The method of claim 11, wherein said utilizing a trained search space classification model to determine the truncation parameter comprises:
determining a first performance indicator should be prioritized over a second performance indicator;
applying a weight value to the first performance indicator that increases a weight of the first performance indicator in determining the truncation parameter; and
determine the truncation parameter based on the server compression factor and the weighted identified attribute.

17. The method of claim 11, wherein the identified attribute comprises at least one of:
a region a computing device is located in, the computing device having transmitted the allocation request;
a type of the virtual machine to be allocated;
a number of virtual machines to be allocated;
a user account associated with the allocation request;
a type of a cluster in the valid set of clusters; or
an age of the cluster in the valid set of clusters.

18. An allocator coupled to a plurality of clusters in a cloud computing environment, the allocator comprising:
a processor circuit; and
a memory that stores program code executable by the processor circuit to perform operations for allocating a virtual machine to the plurality of clusters, the operations comprising:
receiving an allocation request for allocating a virtual machine to the plurality of clusters;
generating a valid set of clusters that includes clusters of the plurality of clusters that satisfy the allocation request;
identifying an attribute associated with the allocation request;
utilizing a trained search space classification model to determine a truncation parameter by:
determining a server compression factor as a ratio of:
a first estimated number of servers to be determined valid by a server selector, and
a second estimated number of servers provided to the server selector for validation, and
determining a truncation parameter based at least on the server compression factor;
generating, based on the truncation parameter, a filtered valid set of clusters from the valid set of clusters that satisfies the allocation request; and
providing the filtered valid set of clusters to the server selector, causing the server selector to:
validate servers within the filtered valid set of clusters based on the allocation request, resulting in a valid set of servers,
select a server from the valid set of servers, and
allocate the virtual machine to the selected server.

19. The allocator of claim 18, wherein the identified attribute comprises at least one of:
a region a computing device is located in, the computing device having transmitted the allocation request to the allocator;
a type of the virtual machine to be allocated;
a number of virtual machines to be allocated;
a user account associated with the allocation request;
a type of a cluster in the valid set of clusters; or
an age of the cluster in the valid set of clusters.

20. The allocator of claim 18, wherein said utilizing a trained search space classification model to determine the truncation parameter comprises:
determining a first performance indicator should be prioritized over a second performance indicator;

applying a weight value to the first performance indicator that increases a weight of the first performance indicator in determining the truncation parameter; and determine the truncation parameter based on the server compression factor and the weighted identified attribute.

* * * * *